United States Patent
Wang et al.

(10) Patent No.: US 12,322,062 B2
(45) Date of Patent: Jun. 3, 2025

(54) IMAGE ENCRYPTION METHOD AND APPARATUS, IMAGE PROCESSING METHOD AND APPARATUS, AND DEVICE AND MEDIUM

(71) Applicant: CHINA UNIONPAY CO., LTD., Shanghai (CN)

(72) Inventors: Qi Wang, Shanghai (CN); Yongkai Zhou, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 18/693,563

(22) PCT Filed: Aug. 15, 2022

(86) PCT No.: PCT/CN2022/112618
§ 371 (c)(1),
(2) Date: Mar. 20, 2024

(87) PCT Pub. No.: WO2023/142440
PCT Pub. Date: Aug. 3, 2023

(65) Prior Publication Data
US 2025/0117880 A1    Apr. 10, 2025

(30) Foreign Application Priority Data

Jan. 28, 2022 (CN) .......................... 202210105850.2

(51) Int. Cl.
G06T 3/4023 (2024.01)
G06T 3/4015 (2024.01)
H04L 9/08 (2006.01)

(52) U.S. Cl.
CPC .......... *G06T 3/4023* (2013.01); *G06T 3/4015* (2013.01); *H04L 9/0822* (2013.01)

(58) Field of Classification Search
CPC .... G06T 3/4023; G06T 3/4015; H04L 9/0822
See application file for complete search history.

(56) References Cited

U.S. PATENT DOCUMENTS

| 6,748,084 B1 | 6/2004 | Gau et al. |
| 10,225,265 B1 | 3/2019 | Sankuratripati |

(Continued)

FOREIGN PATENT DOCUMENTS

| CN | 104040934 A | 9/2014 |
| CN | 105100115 A | 11/2015 |

(Continued)

OTHER PUBLICATIONS

International Search Report and Written Opinion for PCT Appl. No. PCT/CN2022/112618 mailed Nov. 24, 2022.

(Continued)

*Primary Examiner* — Abiy Getachew
(74) *Attorney, Agent, or Firm* — Foley & Lardner LLP

(57) ABSTRACT

Disclosed in the present application are an image encryption method and apparatus, an image processing method and apparatus, and a device and a medium. In the embodiments of the present application, each of a plurality of first target images is obtained after pixel points corresponding to pixel points in an original image are processed, pixel values corresponding to the pixel points contained in each first target image are not exactly the same as pixel values corresponding to the pixel points in the original image, and after the plurality of the first target images are obtained, the plurality of the first target images are respectively sent to corresponding target devices.

16 Claims, 9 Drawing Sheets

(56) References Cited

U.S. PATENT DOCUMENTS

| | | | | |
|---|---|---|---|---|
| 2009/0245513 | A1* | 10/2009 | Takahashi | H04N 1/4486 |
| | | | | 380/54 |
| 2009/0262931 | A1* | 10/2009 | Nakagata | G09C 5/00 |
| | | | | 380/54 |
| 2010/0074437 | A1* | 3/2010 | Inami | H04N 1/444 |
| | | | | 380/28 |
| 2010/0074443 | A1* | 3/2010 | Ishii | H04N 1/32272 |
| | | | | 380/243 |
| 2014/0248929 | A1* | 9/2014 | Noonan | H04L 9/0662 |
| | | | | 463/9 |
| 2019/0028722 | A1 | 1/2019 | Choi et al. | |
| 2020/0218903 | A1 | 7/2020 | Lee et al. | |
| 2020/0265147 | A1 | 8/2020 | Li | |

FOREIGN PATENT DOCUMENTS

| | | |
|---|---|---|
| CN | 108243197 A | 7/2018 |
| CN | 108306876 A | 7/2018 |
| CN | 108810555 A | 11/2018 |
| CN | 110032877 A | 7/2019 |
| CN | 110557361 A | 12/2019 |
| CN | 111199045 A | 5/2020 |
| CN | 111651775 A | 9/2020 |
| CN | 112084525 A | 12/2020 |
| CN | 112307454 A | 2/2021 |
| CN | 112422907 A | 2/2021 |
| CN | 112530551 A | 3/2021 |
| CN | 112653539 A1 | 4/2021 |
| CN | 112802138 A | 5/2021 |
| CN | 113766085 A | 12/2021 |
| CN | 114553499 A | 5/2022 |
| EP | 3 654 578 A1 | 5/2020 |
| JP | 2005-151524 A | 6/2005 |
| JP | 2021-005259 A | 1/2021 |
| TW | 202141310 A | 11/2021 |
| WO | WO-2021/232865 A1 | 11/2021 |

OTHER PUBLICATIONS

Teng et al., "Review of visual cryptography" Communications of the CCISA, Jan. 2015, pp. 73-89, vol. 21, No. 1, Chinese Cryptology and Information Security Association, Taiwan.

* cited by examiner

| 255 | 23 | 42 | 22 |
|---|---|---|---|
| 123 | 94 | 83 | 2 |
| 34 | 44 | 187 | 92 |
| 34 | 76 | 232 | 12 |
| 67 | 83 | 194 | 20 |

R

| 255 | 134 | 202 | 22 |
|---|---|---|---|
| 123 | 94 | 83 | 4 |
| 34 | 44 | 17 | 92 |
| 34 | 76 | 26 | 64 |
| 67 | 83 | 134 | 20 |

G

| 255 | 134 | 93 | 22 |
|---|---|---|---|
| 123 | 94 | 80 | 2 |
| 34 | 45 | 87 | 92 |
| 34 | 74 | 32 | 124 |
| 67 | 63 | 94 | 142 |

B

|     |     |     |     |
| --- | --- | --- | --- |
| P11 | P12 | P13 | P14 |
| P21 | P22 | P23 | P24 |
| P31 | P32 | P33 | P34 |
| P41 | P42 | P43 | P44 |

Fig. 4A

|       |        |       |        |
| ----- | ------ | ----- | ------ |
| P11   | [P12]1 | P13   | [P14]1 |
| [P21]1| P22    | P23   | [P24]1 |
| P31   | P32    | [P33]1| P34    |
| [P41]1| [P42]1 | P43   | [P44]1 |

|        |        |        |        |
| ------ | ------ | ------ | ------ |
| [P11]1 | P12    | [P13]1 | P14    |
| P21    | [P22]1 | [P23]1 | P24    |
| [P31]1 | [P32]1 | P33    | [P34]1 |
| P41    | P42    | [P43]1 | P44    |

Fig. 4B

IMAGE ENCRYPTION METHOD AND APPARATUS, IMAGE PROCESSING METHOD AND APPARATUS, AND DEVICE AND MEDIUM

CROSS REFERENCE TO RELATED APPLICATIONS

The present disclosure is a National Stage of International Application No. PCT/CN2022/112618, filed on Aug. 15, 2022, which claims the priority to Chinese patent application No. 202210105850.2 filed with the China National Intellectual Property Administration on Jan. 28, 2022 and entitled "Image Encryption Method And Apparatus, Image Processing Method And Apparatus, And Device And Medium", the entire content of which is incorporated in this application by reference.

TECHNICAL FIELD

The present disclosure relates to the technical field of data transmission, and in particular to an image encryption method and apparatus, image processing method and apparatus, and equipment and medium.

BACKGROUND

The biometric technology for identification based on images containing users has been widely used in various scenarios, such as finance, security, e-commerce, etc. For example, during the process of registering a user bank card or handling business based on facial recognition, it is necessary to bind facial information with bank card information. Specifically, an image collection device first collects the images containing users, and sends the images containing users and generated password information to a target device, where the target device may be an issuing bank system; the issuing bank system performs facial recognition based on the images containing users and the password information; If verification is successful, the facial information in the images containing users is bound to a corresponding bank card, or it is determined that the user has permission, the corresponding business may be handled based on the corresponding bank card, as shown in FIG. 1.

With the rapid development of biometric technology, people are paying more and more attention to the security of the recognition process. If the images containing users are directly transmitted and stored for subsequent recognition, it will not only face the risk of information leakage, but also face the risk associated with legal compliance.

SUMMARY

The disclosure provides an image encryption method, including:
processing pixel values corresponding to pixels in an original image containing a user according to the number of target devices to receive images, to obtain a plurality of first target images after processing, where the original image is obtained according to the plurality of first target images;
encrypting each of the plurality of first target images with a target key; and
sending each of the plurality of first target images after encryption to each corresponding target device.

Further, the processing the pixel values corresponding to the pixels in the original image containing the user according to the quantity of target devices to receive images, to obtain the plurality of first target images after processing, includes:
for the pixel value of each of the pixels in the original image, splitting the pixel value into the number of sub-pixel values according to the number of target devices to receive images, wherein a sum of the sub-pixel values is equal to the pixel value; and
determining the pixel value of the corresponding pixel after processing in each first target image after processing according to the number of sub-pixel values corresponding to each pixel.

Further, for the pixel value of each of the pixels in the original image, splitting the pixel value into the number of sub-pixel values according to the number of target devices to receive images, includes:
determining a corresponding pixel matrix of the original image on each of preset channels, where each element in the pixel matrix is the pixel value corresponding to each pixel on the corresponding channel;
for each pixel value in the pixel matrix corresponding to each channel, splitting the pixel value in the pixel matrix corresponding to the channel into the quantity of sub-pixel values according to the number of target devices to receive images, where a sum of the sub-pixel values is equal to the pixel value in the pixel matrix corresponding to the channel;
the determining the pixel value of the corresponding pixel after processing in each first target image after processing according to the number of sub-pixel values corresponding to each pixel, includes:
determining the pixel value of the corresponding pixel after processing in each first target image corresponding to each channel after processing, according to the number of sub-pixel values corresponding to each pixel in the pixel matrix corresponding to each channel.

Further, the processing the pixel values corresponding to the pixels in the original image containing the user according to the quantity of target devices to receive images, to obtain the plurality of first target images after processing, includes:
dividing the original image into the number of sub-images according to the number of target devices to receive images; and
for each of the sub-images, setting pixel values of pixels in the original image other than pixels contained in the sub-image as preset pixel values, to obtain the first target image after processing corresponding to the sub-image.

Further, the dividing the original image into the number of sub-images according to the number of target devices to receive images, includes:
determining a second target image corresponding to the original image on each preset channel;
for the corresponding second target image on each channel, dividing the corresponding second target image on the channel into the number of sub-images according to the number of target devices to receive images;
the setting pixel values of pixels in the original image other than pixels contained in the sub-image as preset pixel values, to obtain the first target image after processing corresponding to the sub-image, includes:
for each sub-image corresponding to the corresponding second target image on each channel, setting pixel values of pixels other than pixels contained in the sub-image in the corresponding second target image on the channel to preset pixel values, to obtain the first target image after processing corresponding to the sub-image in the second target image on the channel.

Further, after encrypting each of the plurality of first target images with the target key, before sending each of the plurality of first target images after encryption to each corresponding target device, the method further includes:

dividing the target key into the number of target sub-keys according to the number of target devices, where the number of target sub-keys are spliced into the target key;

encrypting the number of target sub-keys according to a public key from each target device;

the sending each of the plurality of first target images after encryption to each corresponding target device, includes:

sending the first target image after encryption and the target sub-key after encryption to each corresponding target device respectively.

The present disclosure provides an image processing method, applied to a target device, and including:

receiving a first target image after encryption from electronic equipment;

sending an image acquisition instruction to other target devices;

receiving other first target images after encryption from the other target devices;

acquiring a target key, and decrypting the first target image and each of the other first target images based on the target key to obtain each target image; and processing pixel values corresponding to pixels in each target image to obtain an original image.

Further, the method further includes:

inputting the original image into a pre-trained features extraction model, and obtaining and saving feature vectors corresponding to the original image.

Further, the inputting the original image into the pre-trained features extraction model, and obtaining the feature vectors corresponding to the original image, includes:

processing pixel values corresponding to pixels in the original image to obtain a plurality of third target images, where the original image is obtained according to the plurality of third target images;

determining any one of the plurality of third target images as a fourth target image; and performing feature vector extraction on the fourth target image based on the pre-trained features extraction model to obtain feature vectors corresponding to the fourth target image.

Further, the method further includes:

sending the third target images except the fourth target image among the plurality of third target images to the other target devices, to enable the other target devices to perform feature vector extraction on the received third target images based on the pre-trained respectively, to obtain feature vectors corresponding to the respective third target images.

Further, after obtaining the feature vectors corresponding to the target image, the method further includes:

according to the number of target devices, dividing the feature vectors into the number of sub-feature vectors, saving any one of the sub-feature vectors, and sending other sub-feature vectors to the other target devices respectively; and receiving and storing the sub-feature vectors from the other target devices.

Further, after receiving the first target image after encryption from the electronic equipment and before sending the image acquisition instruction to the other target devices, the method further includes:

receiving target verification information from the other target devices, and in response to the target verification information being consistent with standard verification information in pre-stored standard verification information of respective devices, determining that the other target devices are credible, where the target verification information is generated by the other target devices according to identification information and attribute information of the other target devices; and in response to determining that the other target devices are credible, performing the operation of sending the image acquisition instruction to the other target devices.

Further, the acquiring the target key, includes:

receiving a target sub-key after encryption from the electronic equipment, decrypting the target sub-key after encryption based on a private key, and receiving target private sub-keys after decryption from the other target devices; and splicing each received decrypted target private sub-keys to generate the target key.

Further, before receiving the target private sub-keys after decryption from the other target devices, the method further includes:

for each of the other target devices, generating a target public-private key pair, and sending a target public key in the target public-private key pair to the other target devices, to enable the other target devices to decrypt the target private sub-key after encryption based on the private key, and encrypt the target private sub-key after decryption based on the target public key;

after receiving target private sub-keys after decryption from the other target device, before splicing each received decrypted target private sub-key, the method further includes:

decrypting the received target private sub-keys after encryption based on a target private key in the target public-private key pair.

Further, the processing the pixel values corresponding to the pixels in each target image to obtain the original image, includes:

according to the pixel value of each pixel in each target image, determining a sum of the pixel values of the pixel in each target image as the corresponding pixel value of the pixel in the original image.

Further, the determining the sum of the pixel values of the pixel in each target image as the corresponding pixel value of the pixel in the original image, includes:

for the pixel value corresponding to each pixel of each target image in the pixel matrix corresponding to each preset channel, determining the sum of the pixel values corresponding to the pixel of each target image in the pixel matrix corresponding to the channel as the corresponding pixel value of the pixel in the original image in the channel.

Further, the processing the pixel values corresponding to the pixels in each target image to obtain the original image, includes:

for any target image, determining a target pixel whose pixel value in the target image is not a preset pixel value; and setting the pixel value of the target pixel in the original image as the pixel value of the corresponding target pixel in the target image to obtain the original image.

Further, the determining the target pixel whose pixel value in the target image is not the preset pixel value, includes:

according to each pixel in each target image on each preset channel, determining whether the pixel value of the pixel in the target image on the channel is a non-preset pixel value, and if so, determining the pixel is the target pixel on the channel;

the setting the pixel value of the target pixel in the original image as the pixel value of the corresponding target pixel in the target image, to obtain the original image, includes:

setting the pixel value of the target pixel in the original image on the channel as the pixel value of the target pixel in the sub-image corresponding to the target image on the channel; and obtaining the original image according to the pixel value of the target pixel of the original image on each channel.

The present disclosure further provides an image encryption apparatus, including:

a first acquisition module, configured to process pixel values corresponding to pixels in an original image containing a user according to the number of target devices to receive images, to obtain a plurality of first target images after processing, where the original image is obtained according to the plurality of first target images;

an encryption module, configured to encrypt each of the plurality of first target images with a target key; and a first sending module, configured to send each of the plurality of first target images after encryption to each corresponding target device.

Further, the first acquisition module is specifically configured to for the pixel value of each of the pixels in the original image, split the pixel value into the number of sub-pixel values according to the number of target devices to receive images, where a sum of the sub-pixel values is equal to the pixel value; and determine the pixel value of the corresponding pixel after processing in each first target image after processing according to the number of sub-pixel values corresponding to each pixel.

Further, the first acquisition module is specifically configured to determine a corresponding pixel matrix of the original image on each of preset channels, where each element in the pixel matrix is the pixel value corresponding to each pixel on the corresponding channel; for each pixel value in the pixel matrix corresponding to each channel, split the pixel value in the pixel matrix corresponding to the channel into the number of sub-pixel values according to the number of target devices to receive images, where a sum of the sub-pixel values is equal to the pixel value in the pixel matrix corresponding to the channel; and determine the pixel value of the corresponding pixel after processing in each first target image corresponding to each channel after processing, according to the number of sub-pixel values corresponding to each pixel in the pixel matrix corresponding to each channel.

Further, the first acquisition module is specifically configured to divide the original image into the number of sub-images according to the number of target devices to receive images; and for each of the sub-images, set pixel values of pixels in the original image other than pixels contained in the sub-image as preset pixel values, to obtain the first target image after processing corresponding to the sub-image.

Further, the first acquisition module is specifically configured to determine a second target image corresponding to the original image on each preset channel; for the corresponding second target image on each channel, dividing the corresponding second target image on the channel into the quantity of sub-images according to the number of target devices to receive images; for each sub-image corresponding to the corresponding second target image on each channel, set pixel values of pixels other than pixels contained in the sub-image in the corresponding second target image on the channel to preset pixel values, to obtain the first target image after processing corresponding to the sub-image in the second target image on the channel.

Further, the apparatus further includes:

a splitting module, configured to divide the target key into the number of target sub-keys according to the number of target devices, wherein the number of target sub-keys are spliced into the target key;

an encryption module, further configured to encrypt the target sub-keys according to a public key from each target device;

a first sending module, specifically configured to send the first target image after encryption and the target sub-key after encryption to each corresponding target device respectively.

The present disclosure further provides an image processing apparatus, including:

a receiving module, configured to receive a first target image after encryption from electronic equipment;

a processing module, configured to send an image acquisition instruction to other target devices; and receive other first target images after encryption from the other target devices; and a second acquisition module, configured to acquire a target key, and decrypt the first target image and each of the other first target images based on the target key to obtain each target image; and process pixel values corresponding to the pixels in each target image to obtain an original image.

Further, the second acquisition module is further configured to input the original image into a pre-trained features extraction model, and obtain and save feature vectors corresponding to the original image.

Further, the second acquisition module is specifically configured to process pixel values corresponding to pixels in the original image to obtain a plurality of third target images, where the original image is obtained according to the plurality of third target images; and determine any one of the plurality of third target images as a fourth target image; and perform feature vector extraction on the fourth target image based on the pre-trained features extraction model to obtain feature vectors corresponding to the fourth target image.

Further, the apparatus further includes:

a second sending module, configured to send the third target images except the fourth target image among the plurality of third target images to the other target devices, to enable the other target devices to perform feature vector extraction on the received third target image based on the pre-trained feature extraction model respectively, to obtain feature vectors corresponding to the respective third target images.

Further, the second sending module is further configured to according to the number of target devices, divide the feature vectors into the number of sub-feature vectors, and save any one of the sub-feature vectors, and send other sub-feature vectors to the other target devices respectively; and receive and store the sub-feature vectors from the other target devices.

Further, the apparatus further includes:
a verification module, configured to receive target verification information from the other target devices, and in response to the target verification information being consistent with standard verification information in pre-stored standard verification information of respective devices, determine that the other target devices are credible, where the target verification information is generated by the other target devices according to identification information and attribute information of the other target devices; and in response to determining that the other target devices are credible, trigger the processing module.

Further, the second acquisition module is configured to receive a target sub-key after encryption from the electronic equipment, decrypt the target sub-key after encryption based on a private key, and receive target private sub-keys after decryption from the other target devices; andsplice each received decrypted target private sub-keys to generate the target key.

Further, the second sending module is further configured to for each of the other target devices, generate a target public-private key pair, and send a target public key in the target public-private key pair to the other target devices, to enable the other target devices to decrypt the target private sub-key after encryption based on the private key and encrypt the target private sub-key after decryption based on the target public key.

The apparatus further includes:
a decryption module, configured to decrypt the received target private sub-keys after encryption based on a target private key in the target public-private key pair.

Further, the second acquisition module is specifically configured to according to the pixel value of each pixel in each target image, determine a sum of the pixel values of the pixel in each target image as the corresponding pixel value of the pixel in the original image.

Further, the second acquisition module is specifically configured to, for the pixel value corresponding to each pixel of each target image in the pixel matrix corresponding to each preset channel, determine the sum of the pixel values corresponding to the pixel of each target image in the pixel matrix corresponding to the channel as the corresponding pixel value of the pixel in the original image in the channel.

Further, the second acquisition module is specifically configured to, for any target image, determine a target pixel whose pixel value in the target image is not a preset pixel value; and set the pixel value of the target pixel in the original image as the pixel value of the corresponding target pixel in the target image to obtain the original image.

Further, the second acquisition module is specifically configured to according to each pixel in each target image on each preset channel, determine whether the pixel value of the pixel in the target image on the channel is non-preset pixel value, and if so, determine the pixel as the target pixel on the channel; set the pixel value of the target pixel in the original image on the channel as the pixel value of the target pixel in the sub-image corresponding to the target image on the channel; and obtain the original image according to the pixel value of the target pixel of the original image on each channel.

The present disclosure further provides electronic equipment, including a processor, where the processor is configured to execute computer programs stored in a memory to perform any one of the image encryption methods described above.

The present disclosure further provides a computer-readable storage medium, storing computer programs that are executed by a terminal, and when the programs run on the terminal, the terminal executes any one of the image encryption methods described above.

The present disclosure further provides electronic equipment, including a processor, where the processor is configured to execute computer programs stored in a memory to perform any one of the image processing methods described above.

The present disclosure further provides a computer-readable storage medium, storing computer programs that are executed by a terminal, and when the programs run on the terminal, the terminal executes any one of the image processing methods described above.

BRIEF DESCRIPTION OF FIGURES

In order to more clearly illustrate the technical solutions in the embodiments of the present disclosure, the drawings used in the description of the embodiments will be briefly introduced below. Obviously, the drawings in the following description are only part of embodiments of the present disclosure. For those skilled in the art can also obtain other drawings based on these drawings without any creative effort.

FIG. 4A is a schematic diagram of an original image provided by some embodiments of the present disclosure.

FIG. 4B is a schematic diagram of a first target image determined based on an original image provided by some embodiments of the present disclosure.

DETAILED DESCRIPTION

In order to make the purpose, technical solution and advantages of the present disclosure clearer, the present disclosure will be further described in detail below in conjunction with the accompanying drawings. Apparently, the described embodiments are only part but not all of the embodiments of the present disclosure. Based on the embodiments of the present disclosure, all other embodiments obtained by those skilled in the art without making creative efforts belong to the scope of the present disclosure.

In embodiments of the present disclosure, according to the number of target devices to receive images, pixel values corresponding to pixels in an original image containing a user are processed to obtain a plurality of first target images after processing, where the original image is obtained according to the plurality of first target images; each first target image is encrypted by using a target key; and each encrypted first target image is sent to each corresponding target device.

Embodiment 1

In order to ensure the security of image transmission and storage and protect the privacy of users, the embodiments of the present disclosure provide an image encryption method and apparatus, image processing method and apparatus, and equipment and medium.

Figure 1:
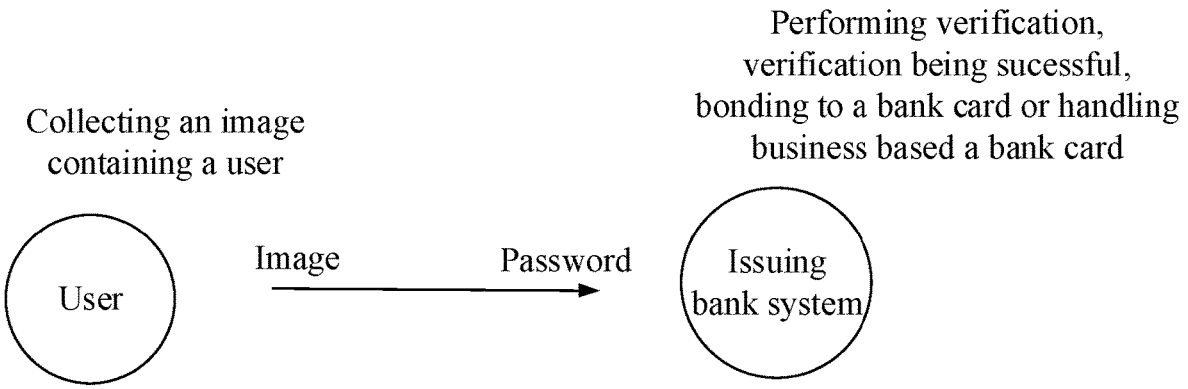
FIG. 1 is a schematic diagram of a process of binding a bank card and handling business based on facial recognition in the related art.
Figure 2:
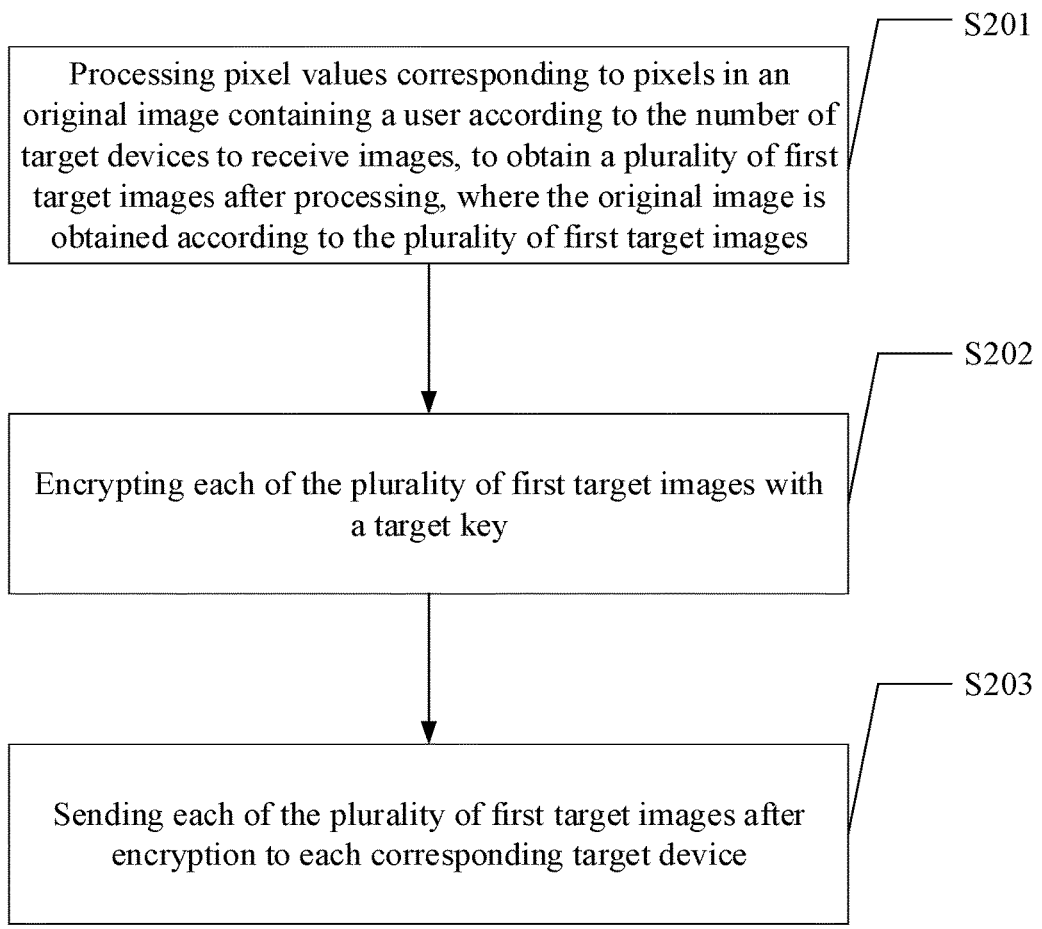
FIG. 2 is a schematic diagram of a process for image encryption provided by some embodiments of the present disclosure.

FIG. 2 is a schematic diagram of a process for image encryption provided by the embodiments of the present disclosure. The process includes the following steps.

S201: processing pixel values corresponding to pixels in an original image containing a user according to the number of target devices for receiving images, to obtain a plurality of first target images after processing, where the original image is obtained according to the plurality of first target images.

The image encryption method provided in embodiments of the present disclosure is applied to electronic equipment. The electronic equipment may be a device such as a smart terminal, a PC, or a server, etc.

In the embodiments of the present disclosure, the electronic equipment obtains the original image containing the user. If the electronic equipment is pre-installed with an image collection device, the original image may be collected by the image collection device of the electronic equipment. If the electronic equipment is not installed with an image collection device, the original image may also be sent to the electronic equipment after being collected by other image collection device.

In the embodiments of the present disclosure, in order to encrypt the image, the user first needs to log into the electronic equipment, and only authorized users can obtain the original image and encrypt the original image. Specifically, the user can verify identity information based on the applications in the electronic equipment. If the applications receive verification information carrying the identity information, it compares pre-stored target user identity information with the received identity information. If there is target user identity information being consistent with the received identity information, it is determined that the verification is successful, and the applications send an image acquisition instruction to the image collection device, so that after receiving the image acquisition instruction, the image collection device collects the original image containing the user and sends the original image to the applications, to cause the applications to obtain the image containing the user. Here, the identity information of the user may include at least one of user's mobile phone number, name, user name, ID card information, and the like.

In order to ensure the security of image transmission or storage, in some embodiments of the present disclosure, the electronic equipment can process the pixel values corresponding to the pixels in the original image containing the user according to the number of target devices for receiving images, to obtain the plurality of first target images. Here, the target device for receiving image is a target device that receives a first target image, and the more the number of target devices are, the more the number of first target images are after processing the pixel values corresponding to the pixels in the original image. Generally, several target devices need to acquire several first target images.

In order to ensure that the corresponding target device can restore the original image after sending the plurality of processed first target images to the corresponding target devices, when processing the pixel values corresponding to the pixels in the original image, it is necessary to ensure that the original image is obtained based on the plurality of processed first target images. For example, each first target image is obtained by processing the pixel values of some pixels in the original image, so the first target images obtained by each target device combine to obtain the original image.

S202: encrypting each of the plurality of first target images with a target key.

In order to ensure security, after obtaining the plurality of first target images, each first target image is encrypted with the target key. Here, the target key may be generated by the electronic equipment itself. For the convenience of subsequent target device decrypting the encrypted first target image to obtain the decrypted first target image, the target key may also be sent to the electronic equipment by the target device. Here, the target key used for encrypting each first target image may be the same or different.

Here, the process of generating the target key is the related art, and will not be repeated herein.

If the target key is generated by the electronic equipment itself, in order to ensure that the target device can subsequently decrypt the encrypted first target image, the electronic equipment also needs to send the target key to the target device, and in order to reduce the workload of the electronic equipment, if the target key is generated by the electronic equipment itself, the electronic equipment may only generate one target key, and encrypt each first target image based on the generated one target key.

S203: sending each of the plurality of encrypted first target images to each corresponding target device.

In the embodiments of the present disclosure, after each encrypted first target image is obtained, each encrypted first target image is sent to each corresponding target device.

In a possible embodiment, if the target key for encrypting each first target image is sent by each target device, in order to facilitate subsequent target device to decrypt the received encrypted first target image, the electronic equipment, for each target device, uses the target key from the target device to encrypt the first target image, and sends the first target image encrypted based on the target key from the target device to the target device.

In another possible embodiment, if the target key for encrypting the plurality of first target images is generated by the electronic equipment, therefore, the target key for encrypting each first target image is the same, the respective encrypted first target images may be randomly sent to the respective corresponding target devices, it only needs to ensure that at least one encrypted first target image is sent to one target device.

Since in the embodiments of the present disclosure, each of the plurality of first target images is obtained after processing the pixel values corresponding to the pixels in the original image, the pixel values corresponding to the pixels contained in each first target image are not all the same as the pixel values corresponding to the pixels in the original image, and since the plurality of first target images are respectively sent to the corresponding target devices after obtaining the plurality of first target images, therefore, regardless of whether the attack is carried out during the transmission of the first target image, or the target device that stores the first target image is attacked, it is impossible to obtain the original image based on a single first target image, which ensures the security of image transmission and storage, protects user privacy and improves user experience.

Embodiment 2

In order to obtain the plurality of first target images, on the basis of the above-mentioned embodiments, in the embodiments of the present disclosure, the processing the pixel values corresponding to the pixels in the original image containing the user according to the number of target devices for receiving images, to obtain the plurality of first target images after processing, includes:

for the pixel value of each of the pixels in the original image, splitting the pixel value into the number of sub-pixel values according to the number of target devices for receiving images, where a sum of the sub-pixel values is equal to the pixel value; and determining the processed pixel value of the corresponding pixel in each processed first target image after processing according to the number of sub-pixel values corresponding to each pixel.

In the embodiments of the present disclosure, in order to obtain the plurality of first target images capable of obtaining the original image, for the pixel value of each pixel in the original image, the pixel value is divided into the number of sub-pixel values according to the number of target devices for receiving images, where the sum of the number of sub-pixel values is the pixel value. For example, if the number of target devices for receiving images is 4, for the pixel value of each pixel in the original image, the pixel value is split into 4 sub-pixel values. Here, the size of each sub-pixel value in the number of sub-pixel values is not limited, and may be any value in [0, 255], but the sum of the number of sub-pixel values should be equal to the pixel value, and the pixel value is generally divided at will can ensure the security of the image.

In order to determine the plurality of first target images, in the embodiments of the present disclosure, for the number of sub-pixel values corresponding to each pixel, any sub-pixel value is used as the pixel value of a corresponding pixel in any first target image, to obtain each processed first target image. Since for each pixel in the original image, the pixel value of the pixel can be split into the number of sub-pixel values, therefore, for each pixel in each first target image, the pixel value of the pixel in the first target image may be any one of the plurality of sub-pixel values corresponding to the pixel, but the sub-pixel values corresponding to the pixel in different first target images are different, as long as the number of sub-pixel values of one pixel is guaranteed as the processed pixel values of the corresponding pixel in each first target image, that is, the sum of the processed pixel values of the corresponding pixel in each first target image is the pixel value of the corresponding pixel in the original image.

Two pixels in the original image are described. The two pixels are pixel A and pixel B respectively. The pixel value corresponding to pixel A is 255, and the pixel value corresponding to pixel B is 60. The number of target devices for receiving images is 3, then the pixel value 255 corresponding to pixel A is split into 3 sub-pixel values, and the sum of the 3 sub-pixel values of pixel A is 255, for example, it may be respectively 20, 30, and 205, or 50, 55, and 150, and so on. The pixel value 60 corresponding to pixel B is split into 3 sub-pixel values, and the sum of the 3 sub-pixel values of pixel B is 60, for example, it may be 10, 24 and 26, or 5, 15 and 40 respectively etc.

If the pixel value corresponding to pixel A is 255, the 3 sub-pixel values after splitting are 20, 30, and 205 respectively, and the pixel value corresponding to pixel B is 60, the 3 sub-pixel values after splitting are 10, 24, and 26 respectively. For the convenience of description, the three first target images are respectively referred to as the first target image 1, the first target image 2 and the first target image 3, then the pixel values corresponding to pixel A and pixel B in the first target image 1 may be 20 and 10, the pixel values corresponding to pixel A and pixel B in the first target image 2 may be 30 and 24, and the pixel values corresponding to pixel A and pixel B in the first target image 3 can be are 205 and 26; or, the pixel values corresponding to pixel A and pixel B in the first target image 1 may also be 20 and 24, and the pixel values corresponding to pixel A and pixel B in the first target image 2 may also be 30 and 10, and the pixel values corresponding to pixel A and pixel B in the first target image 3 may also be 205 and 26; or, the pixel values corresponding to pixel A and pixel B in the first target image 1 may also be 30 and 26, the pixel values corresponding to pixel A and pixel B in the first target image 2 may also be 205 and 10, and the pixel values corresponding to pixel A and pixel B in the first target image 3 may also be 20 and 24, etc.

In order to split the pixel value of each pixel in the original image, on the basis of the above embodiments, in the embodiments of the present disclosure, for the pixel value of each of the pixels in the original image, splitting the pixel value into the number of sub-pixel values according to the number of target devices for receiving images, includes:

determining a corresponding pixel matrix of the original image on each of preset channels, where each element in the pixel matrix is the pixel value corresponding to each pixel on the corresponding channel;

for each pixel value in the pixel matrix corresponding to each channel, splitting the pixel value in the pixel matrix corresponding to the channel into the quantity of sub-pixel values according to the number of target devices for receiving images, where a sum of the sub-pixel values is equal to the pixel value in the pixel matrix corresponding to the channel;

the determining the pixel value of the corresponding pixel after processing in each first target image after processing according to the number of sub-pixel values corresponding to each pixel, includes:

determining the processed pixel value of the corresponding pixel in each processed first target image corresponding to each channel, according to the number of sub-pixel values corresponding to each pixel in the pixel matrix corresponding to each channel.

In the embodiments of the present disclosure, splitting may be performed directly based on the pixel values corresponding to the respective pixels in the original image. Since each pixel in the original image corresponds to a pixel value in each preset channel, if for each pixel value corresponding to each preset channel of each pixel in the original image, the pixel value corresponding to each preset channel of the pixel is split, more security may be ensured. The original image is generally an RGB image, the preset channels are generally R channel, G channel and B channel.

In order to further ensure security, the original image has a pixel matrix corresponding to each preset channel, where one channel corresponds to one pixel matrix, and each element in the pixel matrix is the pixel value of each corresponding pixel in the corresponding channel.

After determining the pixel matrix corresponding to each channel, in order to obtain the plurality of first target images, for each pixel value in the pixel matrix corresponding to each channel, the pixel value in the pixel matrix corresponding to the channel is split into the number of sub-pixel values according to the number of target devices for receiving images, where the sum of the number of sub-pixel values is the pixel value in the pixel matrix corresponding to the channel. Here, the size of each sub-pixel value in the number of sub-pixel values is not limited, which may be any value in [0, 255], but the sum of the number of sub-pixel values should be equal to the pixel value in the pixel matrix corresponding to the channel.

In order to determine the plurality of first target images, in the embodiments of the present disclosure, according to the number of sub-pixel values corresponding to each pixel in the pixel matrix corresponding to each channel, the processed pixel value of a corresponding pixel in each first target image corresponding to each channel after processing is determined.

Since each pixel value in the pixel matrix corresponding to each channel may be split into the plurality of sub-pixel values, for each pixel in each first target image corresponding to each channel, the pixel in the first target image corresponding to the channel may be any one of the plurality of sub-pixel values, but the sub-pixel values corresponding to the pixel in different first target images corresponding to the channel are different.

Figures 3A, 3B:
FIG. 3A is a schematic diagram of an original image provided by some embodiments of the present disclosure.
FIG. 3B is a schematic diagram of a pixel matrix corresponding to each preset channel of an original image provided by some embodiments of the present disclosure.

FIG. 3A is a schematic diagram of an original image provided by some embodiments of the present disclosure. FIG. 3B is a schematic diagram of a pixel matrix corresponding to each preset channel of an original image provided by some embodiments of the present disclosure. FIG. 3A and FIG. 3B are illustrated.

The original image is an RGB image, as shown in FIG. 3A, the original image corresponds to an N*M*3 pixel matrix. Here, N is the number of pixels contained in a length direction of the original image, and M is the number of pixels contained in a width direction of the original image, 3 is the number of channels, which are R channel, G channel and B channel.

Each channel corresponds to one pixel matrix, and for the pixel matrix corresponding to each channel, the pixel matrix corresponding to the channel is an N*M pixel matrix, as shown in FIG. 3B, the pixel matrix corresponding to R channel is:

$$\begin{bmatrix} 255 & 23 & 42 & 22 \\ 123 & 94 & 83 & 2 \\ 34 & 44 & 187 & 92 \\ 34 & 76 & 232 & 12 \\ 67 & 83 & 194 & 20 \end{bmatrix}.$$

The pixel matrix corresponding to G channel is:

$$\begin{bmatrix} 255 & 134 & 202 & 22 \\ 123 & 94 & 83 & 4 \\ 34 & 44 & 17 & 92 \\ 34 & 76 & 26 & 64 \\ 67 & 93 & 134 & 20 \end{bmatrix}.$$

The pixel matrix corresponding to B channel is:

$$\begin{bmatrix} 255 & 134 & 93 & 22 \\ 123 & 94 & 80 & 2 \\ 34 & 45 & 87 & 92 \\ 34 & 74 & 32 & 124 \\ 67 & 63 & 94 & 142 \end{bmatrix}.$$

Embodiment 3

In order to obtain the plurality of first target images, on the basis of the above embodiments, in the embodiments of the present disclosure, the processing the pixel values corresponding to the pixels in the original image containing the user according to the quantity of target devices for receiving images, to obtain the plurality of processed first target images, includes:

dividing the original image into the number of sub-images according to the number of target devices for receiving images; and for each of the sub-images, setting pixel values of pixels in the original image other than pixels contained in the sub-image as preset pixel values, to obtain the processed first target image corresponding to the sub-image.

In the embodiments of the present disclosure, in order to obtain the plurality of first target images capable of obtaining the original image, the original image may be divided into the number of sub-images according to the number of target devices for receiving images. Here, the positions in the original image where each sub-image is located are all different, and the number of sub-images may be spliced into the original image.

In the embodiments of the present disclosure, in order to obtain the plurality of first target images, for each sub-image, the pixel values of other pixels in the original image other than the pixels contained in the sub-image may be set as preset pixel values, to obtain the processed first target image corresponding to the sub-image. Here, the preset pixel value may be 0, or 255, or other pixel values, etc. Specifically, the preset pixel value may be set according to requirements.

If the number of target devices for receiving images is two, the upper half of the original image may be determined as a sub-image, and the lower half of the original image may be determined as a sub-image. For ease of description, the upper half of the original image is referred to as a first sub-image, and the lower half of the original image is referred to as a second sub-image. The other pixels other than the pixels included in the first sub-image in the original image are set to preset pixel values, that is, keep the pixel values of the pixels included in the first sub-image unchanged, and set the pixel values of all pixels in the lower half of the original image to preset pixel values, to obtain the processed first target image corresponding to the first sub-image. The other pixels other than the pixels included in the second sub-image in the original image are set to preset pixel values, that is, keep the pixel values of the pixels included in the second sub-image unchanged, and set the pixel values of all pixels in the upper half of the original image to preset pixels values, to obtain the processed first target image corresponding to the second sub-image.

Alternatively, the original image may also be divided according to a preset rule, and the original image may be divided into multiple areas. Since the number of target devices is known, the multiple areas may be grouped according to the number of target devices to obtain the number of area groups. The areas contained in each group are not repeated, and each area is divided into different groups, and the areas contained in each group constitute a sub-image.

FIG. 4A is a schematic diagram of an original image provided by some embodiments of the present disclosure. FIG. 4B is a schematic diagram of a first target image determined based on the original image provided by some embodiments of the present disclosure. FIG. 4A and FIG. 4B are illustrated.

Assuming that the number of target devices is 2, the obtained original image is shown in FIG. 4A. In FIG. 4A, P11, P12, P13, P14, P21, . . . , P41 are all areas in the original image, and P11, P13, P22, P23, P31, P32, P34, and P43 form a sub-image, and P12, P14, P21, P24, P33, P41, P42, and P44 form another sub-image. For each sub-image, the pixel values of other pixels other than the pixels included in the sub-image of the original image are set to preset pixel values, to obtain the processed first target image corresponding to the sub-image. Specifically, for the sub-image composed of P11, P13, P22, P23, P31, P32, P34, and P43, the pixel values corresponding to the pixels included in P12, P14, P21, P24, P33, P41, P42, and P44 in the original image are set to preset pixel values, to obtain the processed first target image corresponding to the sub-image, as shown in the left image in FIG. 4B. Here, $[P12]_1$, $[P14]_1$, $[P21]_1$, $[P24]_1$, $[P33]_1$, $[P41]_1$, $[P42]_1$, $[P44]_1$ represent that the pixel values corresponding to the pixels included in P12, P14, P21, P24, P33, P41, P42, and P44 have been set to preset pixel values.

For the sub-image composed of P12, P14, P21, P24, P33, P41, P42, and P44, the pixel values corresponding to the pixels contained in P11, P13, P22, P23, P31, P32, P34, and P43 in the original image are set to preset pixel values, to obtain the processed first target image corresponding to the sub-image, as shown in the right image in FIG. 4B. Here, $[P11]_1$, $[P13]_1$, $[P22]_1$, $[P23]_1$, $[P33]_1$, $[P31]_1$, $[P32]_1$, $[P34]_1$, and $[P43]_1$ represent that the pixel values corresponding to the pixels included in P11, P13, P22, P23, P31, P32, P34, and P43 have been set to preset pixel values.

In order to divide the original image into a plurality of sub-images, on the basis of the above embodiments, in the embodiments of the present disclosure, the dividing the original image into the number of sub-images according to the number of target devices to receive images, includes:
  determining a second target image corresponding to the original image on each preset channel;
  for the corresponding second target image on each channel, dividing the corresponding second target image on the channel into the quantity of sub-images according to the number of target devices to receive images;
  the setting pixel values of pixels in the original image other than pixels included in the sub-image as preset pixel values, to obtain the processed first target image after processing corresponding to the sub-image, includes:
  for each sub-image corresponding to the corresponding second target image on each channel, setting pixel values of pixels other than pixels contained in the sub-image in the corresponding second target image on the channel to preset pixel values, to obtain the processed first target image after processing corresponding to the sub-image in the second target image on the channel.

In the embodiments of the present disclosure, the original image may be directly divided into a plurality of sub-images. Since the original image has pixel values corresponding to each preset channel, the image formed by the pixel values corresponding to the pixels in the original image on each preset channel is used as a second target image. Therefore, for the second target image corresponding to each preset channel of the original image, the second target image is divided into sub-images to obtain the first target image corresponding to each channel, which can better ensure security. Here, the original image is generally an RGB image, so the preset channels are generally R channel, G channel and B channel.

In order to further ensure the security, the second target image corresponding to the original image on each preset channel may be determined first, where one channel corresponds to one second target image. For the corresponding second target image on each channel, according to the number of target devices for receiving images, the corresponding second target image on the channel is divided into the number of sub-images.

If the number of target devices to receive images is 3, the second target image corresponding to R channel is divided into 3 sub-images, the second target image corresponding to G channel is divided into 3 sub-images, and the second target image corresponding to B channel is divided into 3 sub-images.

In order to determine the processed first target image corresponding to each sub-image of the second target image on each channel, in the embodiments of the present disclosure, for each sub-image corresponding to the second target image of each channel, the pixel values of other pixels other than the pixels contained in the sub-image in the second target image on the channel are set to preset pixel values, to obtain the processed first target image corresponding to the sub-image of the second target image on the channel.

For ease of description, the corresponding second target images on R channel, G channel, and B channel of the original image are respectively called a second target image A, a second target image B, and a second target image C.

Determining the processed first target image corresponding to each sub-image of the second target image A on R channel is described as an example.

If there are two target devices, the upper half of the second target image A may be determined as a sub-image, and the lower half of the second target image A may be determined as a sub-image. For ease of description, the upper half of the second target image A is called a first sub-image A, and the lower half of the second target image A is called a second sub-image A. The other pixels other than the pixels contained in the first sub-image A in the second target image A are set to preset pixel values, that is, keep the pixel values of the pixels contained in the first sub-image A in the original image unchanged, and set the pixel values of all the pixels contained in the lower half of the image to preset pixel values, to obtain the processed first target image corresponding to the first sub-image A of the second target image; the other pixels other than the pixels contained in the second sub-image A in the second target image A are set to preset pixel values, that is, keep the pixel values of the pixels contained in the second sub-image A in the original image unchanged, and set the pixel value of all the pixels contained in the upper part of the image to preset pixel values, to obtain the processed first target image corresponding to the second sub-image A of the second target image A.

Embodiment 4

In order to facilitate the target device to decrypt the first target image based on the target key, on the basis of the above embodiments, in the embodiments of the present disclosure, after encrypting each of the plurality of first target images with the target key, before sending each of the plurality of encrypted first target images after encryption to each corresponding target device, the method further includes:

dividing the target key into the number of target sub-keys according to the number of target devices, where the number of target sub-keys can be spliced into the target key;

encrypting the target sub-keys according to a public key from each target device;

the sending each of the plurality of encrypted first target images to each corresponding target device, includes:

sending the encrypted first target image and the encrypted target sub-key to each corresponding target device respectively.

The target key for encrypting the plurality of first target images may be generated by the electronic equipment, and may also be generated by the target device and sent to the electronic equipment. In the embodiments of the present disclosure, if the target key is generated by the electronic equipment, in order for the subsequent target device to be able to decrypt the encrypted first target image based on the target key, the electronic equipment needs to send the target key to the target device.

In order to improve the security, the electronic equipment may also divide the target key into multiple target sub-keys. Specifically, according to the number of target devices for receiving images, the target key is divided into the number of target sub-keys. Here, the number of target sub-keys can be spliced into a target key. Each target private sub-key is a part of the target key.

For example, if the target key is AZ2y789t0 and the number of target devices is 2, then the target key is divided into two target private sub-keys, i.e., AZ2y and 789t0 respectively.

In order to improve the security, after obtaining multiple target private sub-keys, the number of target private sub-keys may also be encrypted according to the public key received from each target device to obtain the encrypted target private sub-key. Specifically, the number of multiple target private sub-keys obtained by the electronic equipment is the same as the number of public keys received from the target devices. There is no limit based on which public key encrypts which target private sub-key. It only needs to ensure that the public key from each target device can be used to encrypt different target private sub-keys. Here, the public keys from different target devices are different.

In order to reduce the workload of the electronic equipment and the target device, the encrypted target private sub-key and the encrypted first target image may be sent to the corresponding target device concurrently.

Embodiment 5

Figure 5:
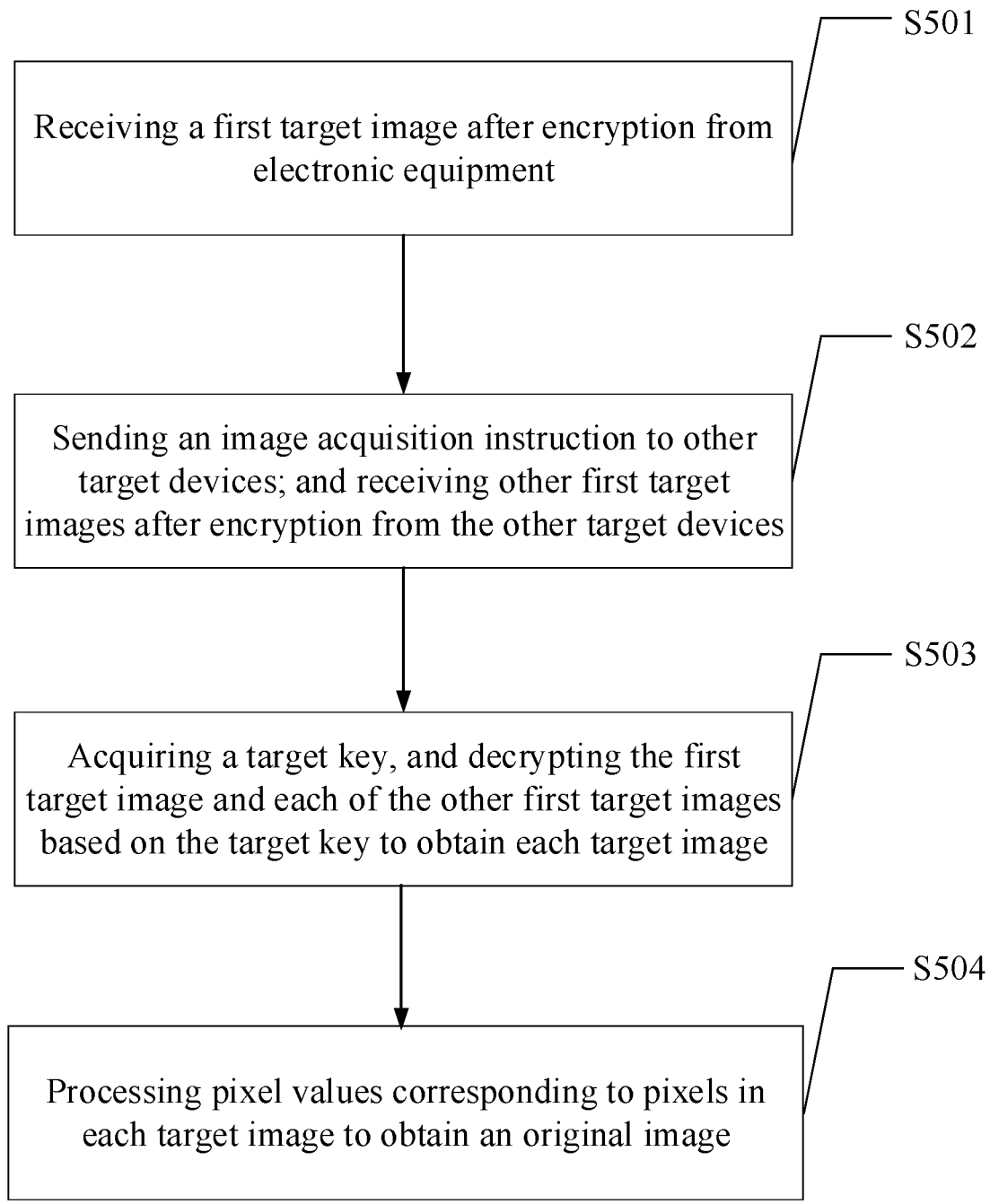
FIG. 5 is a schematic diagram of a process for image processing provided by some embodiments of the present disclosure.

FIG. 5 is a schematic diagram of a process for image processing provided by some embodiments of the present disclosure. The process includes the following steps.

S501: receiving an encrypted first target image from electronic equipment.

The image processing method provided in the embodiments of the present disclosure is applied to a target device. The target device may be a device such as a smart terminal, a PC, or a server, etc., and the target device is not the same device as the electronic equipment that encrypts the image.

In the embodiments of the present disclosure, in order to obtain the original image, the target device receives the encrypted first target image from the electronic equipment.

S502: sending an image acquisition instruction to other target devices; and receiving other encrypted first target images from the other target devices.

In the embodiments of the present disclosure, the target device for image processing may be any target device, and the target device may be pre-configured with information of other target devices that simultaneously receive the encrypted first target image sent by the electronic equipment, so as to facilitate the target device to communicate with other target devices, and obtain other encrypted first target images sent by other target devices.

Since the processed first target images obtained by the electronic equipment are respectively sent to the corresponding target devices, in the embodiments of the present disclosure, in order to obtain the original image, the target device performing image processing needs to send an image acquisition instruction to other target devices, and receive other encrypted first target images sent by other target devices.

In a possible embodiment, for each of the other target devices, the other encrypted first target image in the other target device may be generated by the electronic equipment encrypting the first target image based on the received target key and sent to the other target devices. The target key is generated and sent to the electronic equipment by the other target devices. The other target devices directly send the encrypted first target image received from the electronic equipment to the target device.

In another possible embodiment, for each of the other target devices, the other encrypted first target image may be also encrypted in each of the other target devices based on a target key generated through the electronic equipment, and sent to the other target devices. The other target devices send the encrypted first target image from the electronic equipment to the target device.

S503: acquiring a target key, and decrypting the first target image and each of the other first target images based on the target key to obtain each target image.

In the embodiments of the present disclosure, in order to obtain the original image, the target device decrypts the encrypted first target image received by itself and other encrypted first target images from other target devices to obtain each target image. Here, the target image is an unencrypted first target image.

In a possible embodiment, if the target key for encrypting all first target images is generated by the electronic equipment, the target key for encrypting each first target image is the same, therefore, the target key acquired by the target device is sent by the electronic equipment. When decrypting the received first target image and each of the other first target images, the same target key is used for decryption to obtain each target image.

In another possible embodiment, if the target key for encrypting all first target images is generated by the corresponding target device, the target key for encrypting each first target image is generated by a different target device and is different. Therefore, the target device obtains the target key generated by itself for encrypting its first target image, and obtains the target keys generated by other target devices and sent to the target device. When decrypting the received first target image and each of the other first target images, the target key corresponding to the first target image is used for decryption to obtain the target image corresponding to the first target image.

S504: processing pixel values corresponding to pixels in each target image to obtain an original image.

In the embodiments of the present disclosure, after obtaining each target image, in order to obtain the original image, the pixel values corresponding to the pixels in each target image are processed.

Specifically, in order to ensure that the original image is accurately obtained based on each target image, the electronic equipment and the target device pre-agree on a pixel value processing manner, that is, the target device knows the method with which the electronic equipment processes the pixel values of the pixels in the original image, the corresponding pixel value processing manner is determined according to the method, and the processing manner is used to process pixel values corresponding to pixels in each target image to obtain the original image.

In the embodiments of the present disclosure, since the target device obtains the original image after receiving the encrypted first target image from the electronic equipment and other encrypted first target images from other target devices, it is impossible to obtain the original image based on the received encrypted first target image, even if there are loopholes or attacks, there will be no security risks, which protects user privacy and improves user experience.

Embodiment 6

In order to determine feature vectors corresponding to the original image to facilitate subsequent identification based on the feature vectors, on the basis of the above embodiments, the method further includes:
inputting the original image into a pre-trained features extraction model, and obtaining and saving feature vectors corresponding to the original image.

In order to accurately perform features extraction on the original image and obtain corresponding feature vectors of the original image, in the embodiments of the present disclosure, the features extraction model is pre-trained, and the original image is input into the pre-trained features extraction model to obtain the feature vectors corresponding to the original image, and save the obtained feature vectors.

In the embodiments of the present disclosure, in order to improve the accuracy of the determined feature vectors corresponding to the original image, before inputting the original image into the pre-trained features extraction model, the original image can be pre-processed first, such as denoising, grayscale, face detection, normalization, etc., and the processed original image is input into the pre-trained features extraction model for target features extraction.

Here, the process of pre-processing the original image is introduced in the related art, and will not be repeated herein.

In order to improve the security, on the basis of the above embodiments, the inputting the original image into the pre-trained features extraction model, and obtaining the feature vectors corresponding to the original image, includes:
processing pixel values corresponding to the pixels in the original image to obtain a plurality of third target images, where the original image is obtained according to the plurality of third target images;
determining any one of the plurality of third target images as a fourth target image; and
performing feature vector extraction on the fourth target image based on the pre-trained features extraction model to obtain feature vectors corresponding to the fourth target image.

In the embodiments of the present disclosure, the target device directly saves the determined feature vectors corresponding to the original image in the target device after obtaining the feature vectors corresponding to the original image, if the target device has a loophole or is attacked, since the feature vectors corresponding to the original image saved in the target device can be directly obtained, it has the risk of insecurity. In order to improve the security, in the embodiments of the present disclosure, the pixel values corresponding to the pixels in the original image can be processed to obtain the plurality of third target images, and the features extraction for the plurality of third target images may be performed in different target devices. Here, the plurality of third target images can obtain the original image. Specifically, in the embodiments of the present disclosure, the target device can process the pixel values corresponding to the pixels in the original image based on the pre-trained features extraction model deployed in the target device to obtain the plurality of third target images from the pre-trained features extraction model, or the target device can directly process the pixel values corresponding to pixels in the original image to obtain the plurality of third target images.

The process of processing, by the target device, the pixel values corresponding to the pixels in the original image to obtain the plurality of third target images and the process of processing, by the electronic equipment, the pixel values corresponding to the pixels in the original image to obtain the plurality of first target images are the same, which is not repeated herein.

Figure 6A:
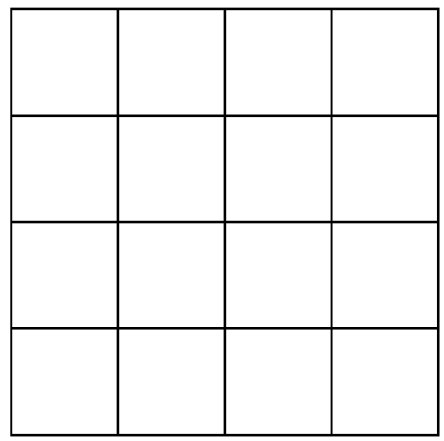
FIG. 6A is a schematic diagram of an original image provided by some embodiments of the present disclosure.
Figure 6B:
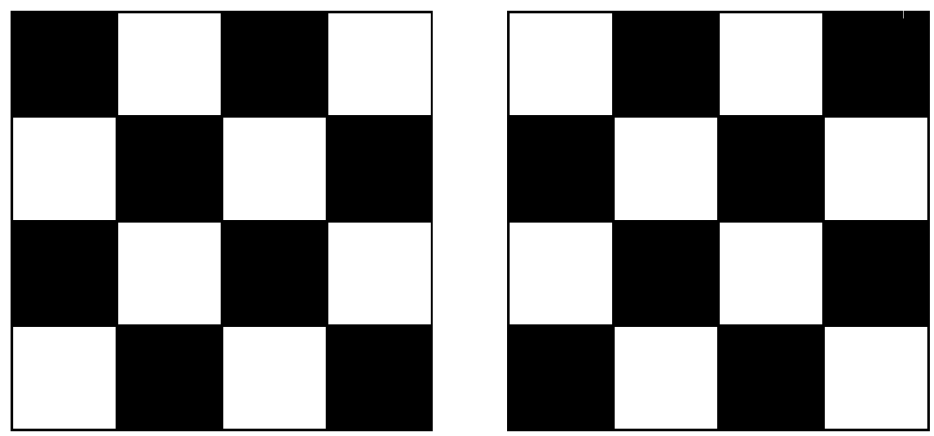
FIG. 6B is a schematic diagram of a third target image obtained after processing pixel values corresponding to pixels in an original image provided by some embodiments of the present disclosure.
Figure 6C:
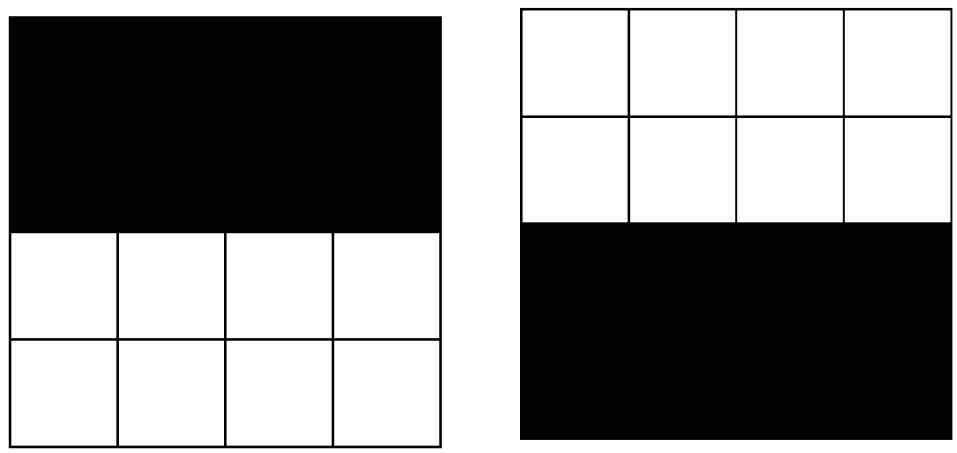
FIG. 6C is another schematic diagram of a third target image obtained after processing pixel values corresponding to pixels in an original image provided by some embodiments of the present disclosure.

FIG. 6A is a schematic diagram of the original image provided by some embodiments of the present disclosure. FIG. 6B is a schematic diagram of a third target image obtained after processing pixel values corresponding to pixels in the original image provided by some embodiments of the present disclosure. FIG. 6C is another schematic diagram of a third target image obtained after processing pixel values corresponding to pixels in the original image provided by some embodiments of the present disclosure. FIG. 6A, FIG. 6B and FIG. 6C will be described.

Assuming that the number of target devices is 2 for description, the original image may be divided into two sub-images, where white squares in FIG. 6A represent the respective areas of the original image.

For each sub-image, the pixel values of other pixels in the original image except the pixels contained in the sub-image are set to preset pixel values, to obtain the processed first target image corresponding to the sub-image. Here, black squares in FIG. 6B and FIG. 6C indicate that the pixel values of the pixels corresponding to the area in the original image are set to preset pixel values. In this view, the pixel values corresponding to the same pixel in the processed first target images corresponding to each of the two sub-images divided from the original image are different, and there are many possibilities for the specific determination of the first target original image, where FIG. 6B and FIG. 6C show two possibilities, one of which is shown in two images in FIG. 6B, and the other is shown in two images in FIG. 6C.

In the embodiments of the present disclosure, the target device may determine any third target image among the plurality of third target images as a fourth target image, and continue to perform feature vector extraction on the fourth target image based on the pre-trained features extraction model deployed in the target device, to obtain the feature vectors corresponding to the fourth target image, and save the feature vectors corresponding to the fourth target image.

In order to enable other target devices to perform features extraction on the third target image, on the basis of the above embodiments, the method further includes:

sending the third target images except the fourth target image among the plurality of third target images to the other target devices, to enable the other target devices to perform feature vector extraction on the received third target images based on the pre-trained features extraction model respectively, to obtain feature vectors corresponding to the respective third target images.

Since the target device determines a plurality of third target images, after the target device determining the fourth target image via features extraction from the plurality of third target images, the target device sends the third target images except the fourth target image among the plurality of third target images to other target devices respectively. Here one third target image is sent to one other target device.

After sending the third target images except the fourth target image among the plurality of third target images to the corresponding other target devices, the other target devices respectively perform features extraction on the received third target image based on their own pre-trained features extraction models to obtain feature vectors corresponding to the third target image, and save the obtained feature vectors.

Embodiment 7

In order to further improve the security, on the basis of the above embodiments, after obtaining the feature vectors corresponding to the target image, the method further includes:

according to the number of the target devices, dividing the feature vectors into the number of sub-feature vectors, saving any one of the sub-feature vectors, and sending other sub-feature vectors to the other target devices respectively; and receiving and storing the sub-feature vectors from the other target devices.

After determining the feature vectors corresponding to the fourth target image, the target device can directly save the feature vectors, even if the fourth target image is obtained by setting pixel values corresponding to other pixels except pixels included in the sub-image in the original image based on the sub-image divided from the original image, part of features in the original image can be extracted. Therefore, in order to further improve the security, in the embodiments of the present disclosure, the feature vector may be further divided, part of sub-feature vectors among the plurality of obtained sub-feature vectors after division are saved, and the remaining sub-feature vectors are sent to other target devices for storage.

In the embodiments of the present disclosure, the feature vector may be divided into the number of sub-feature vectors according to the number of target devices. Here, the number of target devices includes the target device itself and other target devices, and the sum of the number of sub-feature vectors is the feature vector.

If the number of target devices is 2 and the feature vector is (a, b), then the feature vector is divided into 2 sub-feature vectors, namely (a1, b1) and (a2, b2), where a=a1+a2, b=b1+b2.

Figure 7A:
FIG. 7A is a schematic diagram before dividing a feature vector provided by some embodiments of the present disclosure.
Figure 7B:
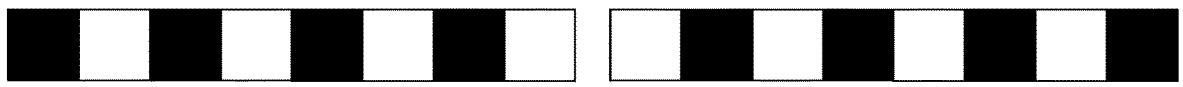
FIG. 7B is a schematic diagram after dividing a feature vector provided by some embodiments of the present disclosure.
Figure 7C:
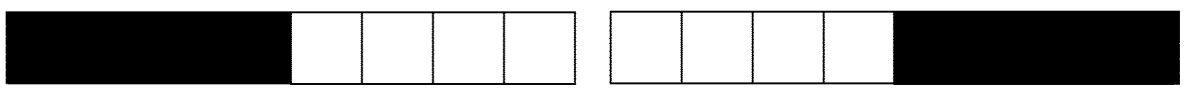
FIG. 7C is another schematic diagram after dividing a feature vector provided by some embodiments of the present disclosure.

FIG. 7A is a schematic diagram before division of a feature vector provided by some embodiments of the present disclosure. FIG. 7B is a schematic diagram after division of a feature vector provided by some embodiments of the present disclosure. FIG. 7C is another schematic diagram after division of a feature vector provided by some embodiments of the present disclosure. FIG. 7A, FIG. 7B and FIG. 7C are described.

There are many ways to split the feature vector. If the number of target devices is two, each component in the feature vector may be split into two sub-feature vectors, where the sum of the two sub-feature vectors is equal to the component. For part of components in each component of the feature vector, part of components in the feature vector is kept unchanged, the components other than the part of components in the feature vector are set to preset values, to determine a sub-feature vector. The part of the components in the feature vector are set to preset values, the components in the feature vector other than the part of the components are kept unchanged, to determine another sub-feature vector. Here, the preset value may be 0, as shown in FIG. 7A, a square frame represents each component in the feature vector, as shown in FIG. 7B and FIG. 7C, a white square frame represents a component that remains unchanged, and a black square box represents components set to preset values. There are multiple possibilities for specific determination of sub-feature vectors. FIG. 7B and FIG. 7C show two possibilities respectively, one of which is shown in two images in FIG. 7B, and the other is shown in two images in FIG. 7C.

After dividing the feature vector into the number of sub-feature vectors according to the number of target devices, any one of the sub-feature vectors in the number of sub-feature vectors is saved, and the other sub-feature vectors are sent to other target devices. Here, one sub-feature vector is sent to one other target device.

Similarly, for each other target device, after determining the feature vector corresponding to the third target image, the other target device divides the feature vector, and saves one sub-feature vector after division, and the other sub-feature vectors are respectively sent to other target devices except itself, so each target device will receive the sub-feature vectors from the other target device.

In the embodiments of the present disclosure, the process of encrypting an image by electronic equipment and the process of processing an image by a target device can be applied in a user identity registration scenario, and can also be used in a user identity identification scenario. Specifically, if the present disclosure is applied in the user identity registration scenario, the target device directly saves a sub-feature vector corresponding to an obtained fourth target image and received sub-feature vectors from other target devices. Similarly, for each other target device, the other target device also saves a sub-feature vector corresponding to the third target image obtained by itself and received sub-feature vectors from other target devices. If the present disclosure is applied in the user identity identification scenario, the target device can directly obtain a sub-feature vector corresponding to the fourth target image and received sub-feature vectors from other target devices, and can determine an Euclidean distance between the pre-stored sub-feature vectors corresponding to each user based on the pre-stored sub-feature vectors corresponding to each user, and identify the identification of the user according to the Euclidean distance and a preset threshold value. Similarly, the process of identifying the other target device and the process of identifying the target device are the same, and will not be repeated herein. According to an identification result of each target device, the identity of the user is determined. The target devices include all other target devices and the target device. Specifically, it can be determined that whether the identification results recognized by each target device are consistent. If they are consistent, any identification result recognized by any target device may be determined as the final identification result.

Here, the process of determining the Euclidean distance between two sub-feature vectors is introduced in the related art, and will not be repeated herein.

In the embodiments of the present disclosure, after determining the identification result, each target device can further output the respective determined identification result, specifically, it can be output in the form of text or voice, for example, displaying the text of "recognizing that the user is user A" on the display interface, or outputting the voice of "recognizing that the user is user A".

Embodiment 8

In order to improve the security, on the basis of the above embodiments, after receiving the encrypted first target image from the electronic equipment and before sending the image acquisition instruction to the other target devices, the method further includes:
receiving target verification information from the other target devices, and in response to the target verification information being consistent with standard verification information in pre-stored standard verification information of respective devices, determining that the other target devices are credible, where, the target verification information is generated by the other target devices according to identification information and attribute information of the other target devices; and
in response to the other target devices being credible, performing the operation of sending the image acquisition instruction to the other target devices.

In the embodiments of the present disclosure, in order for the target device to obtain the original image, and because the encrypted first target image is stored in different target devices, the target device needs to communicate with each other target device to obtain the encrypted first target image stored in the each other target device.

In the embodiments of the present disclosure, in order to improve the security, after receiving the encrypted first target image from the electronic equipment, before sending an acquisition instruction to other target devices, it is first determined whether the other target devices are credible.

In order to determine whether other target devices are credible, the target device first receives target verification message generated by other target devices based on identification information and attribute information of the other target devices. Here, the identification information and attribute information of the other target devices are pre-stored in other target devices, and the attribute information may be version information, device information, etc., of the target device. Here, the target verification information may be a verification signature or a verification report.

Here, the process of generating the verification signature and the verification report is introduced in the related art, and will not be repeated herein.

In order to verify whether the other target device is credible, in the embodiments of the present disclosure, the target device receives target verification information from the other target device, and determines whether there is standard verification information being consistent with the target verification information in pre-stored standard verification information of each device. If consistent standard verification information exists, it is determined that the other target device is credible, and if consistent standard verification information does not exist, it is determined that the other target device is not credible.

In the embodiments of the present disclosure, since there are different user identification or user registration processes, and each time the user identification or user registration exists, it is necessary to send an acquisition instruction to other target devices, before sending the acquisition instruction to other target devices, it first verifies whether other target devices are credible. Therefore, in order to accurately distinguish which user identification or which user registration is verified, the target device can generate a random number before receiving target verification message from other target devices, and send the random number to other target devices. After generating the target verification message, the other target devices can send the random number and the target verification message to the target device at the same time. Here, the random number is randomly generated, and the random number is only used to distinguish which user identification or user registration process is aimed at.

In the embodiments of the present disclosure, the standard verification information of each device can be pre-stored in the target device, and can also be stored in a verification service system. If it is saved in the verification service system, after obtaining the target verification message from the other target devices, the target device sends a verification information acquisition request to the verification service system, obtains and saves standard verification information of each device from the verification service system, and then verify whether the other target devices are credible based on the standard verification information of each device and the target verification information from other target devices. Specifically, which device the standard verification information of each device is stored in is not limited.

In the embodiments of the present disclosure, if it is determined that all other target devices are credible, the operation of sending an acquisition instruction to other target devices is performed. If any other target device is not credible, in order to ensure the security, no acquisition instruction is sent to other target devices.

In the embodiments of the present disclosure, after receiving the encrypted first target image from the electronic equipment, before sending the acquisition instruction to other target devices, it is verified whether other target devices are credible, and the communication security of the encrypted first target image is guaranteed, while the security of data processing process of the encrypted first target image can also be ensured.

Embodiment 9

In order to obtain the target key, on the basis of the above embodiments, in the embodiments of this application, the acquiring the target key, includes:

receiving an encrypted target sub-key from the electronic equipment, decrypting the encrypted target sub-key based on a private key, and receiving encrypted target sub-keys from the other target devices; and splicing each decrypted target private sub-keys to generate the target key.

In the embodiments of the present disclosure, if the target key is generated by the electronic equipment, and the electronic equipment divides the target key into the plurality of target sub-keys, each target sub-key is encrypted and sent to the corresponding target device, where the public key for encrypting each target sub-key is generated and sent by the corresponding target device. Therefore, the target device will receive an encrypted target sub-key from the electronic equipment, and decrypt the encrypted target sub-key based on the private key generated by itself, where the private key and the public key sent to the electronic equipment and used by the electronic equipment to encrypt the target sub-key form a public-private key pair. Here, the public-private key pair may be an asymmetric public-private key pair, or a symmetric public-private key pair. In the embodiments of the present disclosure, the public-private key pair is an asymmetric public-private key pair, and the asymmetric public-private key pair may be a public key infrastructure (PKI) asymmetric public-private key pair.

Here, the process of generating the public-private key pair is introduced in the related art, and will not be repeated herein.

In the embodiments of the present disclosure, in order to obtain the target key, the target device needs to obtain the target sub-key sent by the electronic equipment to each of other target devices. Because the target sub-key sent by the electronic equipment to each of other target devices is a target sub-key encrypted based on the public key sent by the other target devices, the target sub-key received by the target device from other target devices is decrypted target sub-key. Specifically, the received decrypted target sub-key is a target sub-key obtained by decrypting the encrypted target sub-key based on the private key generated by the other target devices.

In the embodiments of the present disclosure, the target device splices each decrypted target sub-key to generate the target key. Specifically, in order to splice accurately, the target device needs to determine the splicing order of each target sub-key. In the embodiments of the present disclosure, the electronic equipment can divide the target key into target sub-keys, and set identification information for each target sub-key according to positions of the obtained target private sub-keys in the target key. For example, if the target key is divided into two target sub-keys, identification information of the former target sub-key in the target key is set to 1, and identification information of the later target sub-key in the target key is set to 2. When the electronic equipment sends the target sub-key to other corresponding target devices, it also sends the corresponding identification information to the other target devices. When the other target devices send the decrypted target sub-key to the target device, they also need to send the identification information of the target sub-key to the target device. After receiving each decrypted target sub-key and the identification information of each target sub-key, the target device splices each decrypted target sub-key according to the identification information of each target sub-key to generate the target key.

In order to ensure the security in the process of receiving the target sub-key from the other target devices, on the basis of the above embodiments, before receiving the target private sub-keys after decryption from the other target devices, the method further includes:

for each of the other target devices, generating a target public-private key pair, and sending a target public key in the target public-private key pair to the other target devices, to enable the other target devices to decrypt the encrypted target private sub-key based on the private key, and encrypt the decrypted target private sub-key based on the target public key;

after receiving decrypted target private sub-keys from the other target device, before splicing each received decrypted target private sub-key, the method further includes:

decrypting the encrypted target private sub-keys based on a target private key in the target public-private key pair.

In the embodiments of the present disclosure, since the target device receives the decrypted target sub-key from other target devices to determine the target key, and then decrypts the encrypted first target image, if the process of receiving by the target device the decrypted target sub-key has data leakage or tampering, which will seriously affect the security or cause the subsequent inability to decrypt the encrypted first target image, and eventually the original image cannot be restored. Therefore, in the embodiments of the present disclosure, before receiving the decrypted target sub-keys from other target devices, a target public-private key pair may be generated for each of other target devices, and the target public key in the target public-private key pair may be sent to other target devices, so that the other target devices decrypt the encrypted target sub-key based on their own private key, and then encrypt the decrypted target sub-key based on the received target public key from the target device, and send the encrypted target private sub-key to the target device. Here, for each of other target devices, the target device may generate a target public-private key pair corresponding to the other target device. That is, different target public-private key pairs may be generated for other different target devices. In order to reduce the workload of the target device, the same target public-private key pair is generated for all other target devices.

After receiving the encrypted target private sub-key, the target device decrypts the received encrypted target sub-key based on the target private key in the generated target public-private key pair to obtain the target sub-key.

Embodiment 10

In order to obtain the original image, on the basis of the above embodiments, the processing the pixel values corresponding to the pixels in each target image to obtain the original image, includes:

according to the pixel value of each pixel in each target image, determining a sum of the pixel values of the pixel in each target image as the corresponding pixel value of the pixel in the original image.

In the embodiments of the present disclosure, if the electronic equipment divides the pixel value of each pixel in the original image into multiple sub-pixel values, and determines the processed pixel value of the corresponding pixel in each first target image according to multiple sub-pixel values corresponding to each pixel and then determines the first target image, then the target device obtains the original image according to each target image, determines a sum of the pixel value of the pixel in each target image as the pixel value corresponding to the pixel in the original image according to each corresponding pixel in each target image, and then obtains the original image.

In order to obtain the original image, on the basis of the above embodiments, the determining the sum of the pixel values of the pixel in each target image as the corresponding pixel value of the pixel in the original image, includes:

for the pixel value corresponding to each pixel of each target image in the pixel matrix corresponding to each preset channel, determining the sum of the pixel values corresponding to the pixel of each target image in the pixel matrix corresponding to the channel as the corresponding pixel value of the pixel in the original image in the channel.

In the embodiments of the present disclosure, if the electronic equipment splits the pixel value in the pixel matrix corresponding to each channel into multiple sub-pixel values for each pixel value in the pixel matrix corresponding to each channel, and determines the processed pixel value of the corresponding pixel in each first target image corresponding to each channel according to the number of sub-pixel values corresponding to each pixel in the pixel matrix corresponding to each channel, then in order to restore the original image, for each pixel of the target image in the preset pixel matrix corresponding to each channel, the target device determines the sum of the pixel values corresponding to the pixel in the pixel matrix corresponding to the channel of each target image as the pixel value corresponding to the pixel of the original image in the channel.

Embodiment 11

In order to obtain the original image, on the basis of the above embodiments, the processing the pixel values corresponding to the pixels in each target image to obtain the original image, includes:

for any target image, determining a target pixel whose pixel value in the target image is not a preset pixel value; and setting the pixel value of the target pixel in the original image as the pixel value of the corresponding target pixel in the target image, to obtain the original image.

In the embodiments of the present disclosure, if the electronic equipment divides the original image into multiple sub-images, and for each sub-image, sets pixel values of pixels in the original image other than the pixels included in the sub-image to preset pixel values, to obtain the processed first target image corresponding to the sub-image. Then, in order to obtain the original image, the target device can, for any target image, determine that the pixel value of the pixel in the target image is not the preset pixel value, and set the pixel value of the target pixel in the original image to the pixel value of the corresponding target pixel in the target image to obtain the original image.

In order to obtain the original image, on the basis of the above-embodiments, the determining the target pixel whose pixel value in the target image is not preset pixel value, includes:

according to each pixel in each target image on each preset channel, determining whether the pixel value of the pixel in the target image on the channel is a non-preset pixel value, and if so, determining the pixel as the target pixel on the channel;

the setting the pixel value of the target pixel in the original image on the channel as the pixel value of the target pixel in the target image, to obtain the original image, includes:

setting the pixel value of the target pixel in the original image on the channel as the pixel value of the target pixel in the sub-image corresponding to the target image on the channel; and obtaining the original image according to the pixel value of the target pixel of the original image on each channel.

In the embodiments of the present disclosure, if the electronic equipment divides the corresponding second target image on the channel into a plurality of sub-images according to the second target image corresponding to the original image on each preset channel, for each sub-image corresponding to the second target image corresponding to each channel, the pixel values of other pixels other than the pixels contained in the sub-image in the corresponding second target image on the channel are set to preset pixel values, to obtain the processed first target image corresponding to the sub-image of the second target image on the channel. In order to determine the original image, the target device may determine whether the pixel value of the pixel in the target image on the channel is a non-preset pixel value according to each pixel in each target image on each preset channel, if so, it determines the pixel as the target pixel on the channel, and sets the pixel value of the target pixel in the original image on the channel to the pixel value of the target pixel in the sub-image corresponding to the target image on the channel, and the original image is obtained according to the pixel value of the target pixel of the original image on each channel.

Figure 8A:
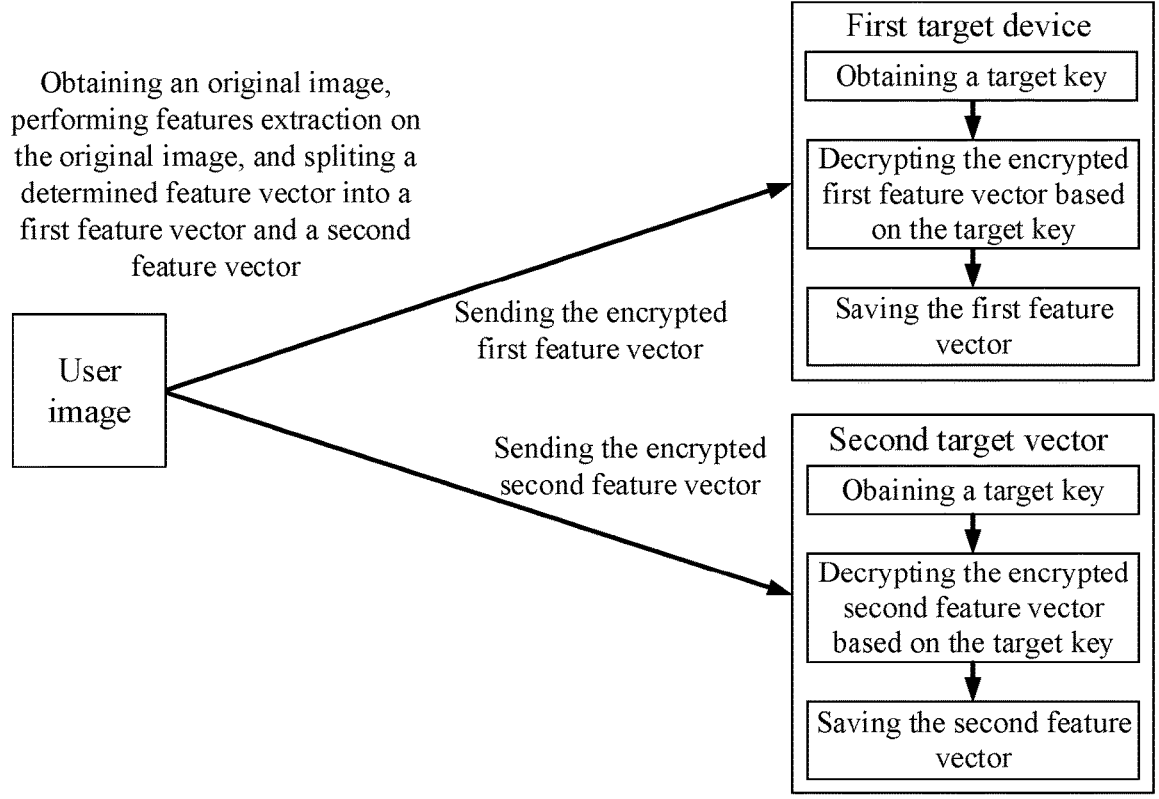
FIG. 8A is a schematic diagram of a process for recognizing a feature vector corresponding to an original image containing a user based on MPC in the related art.
Figure 8B:
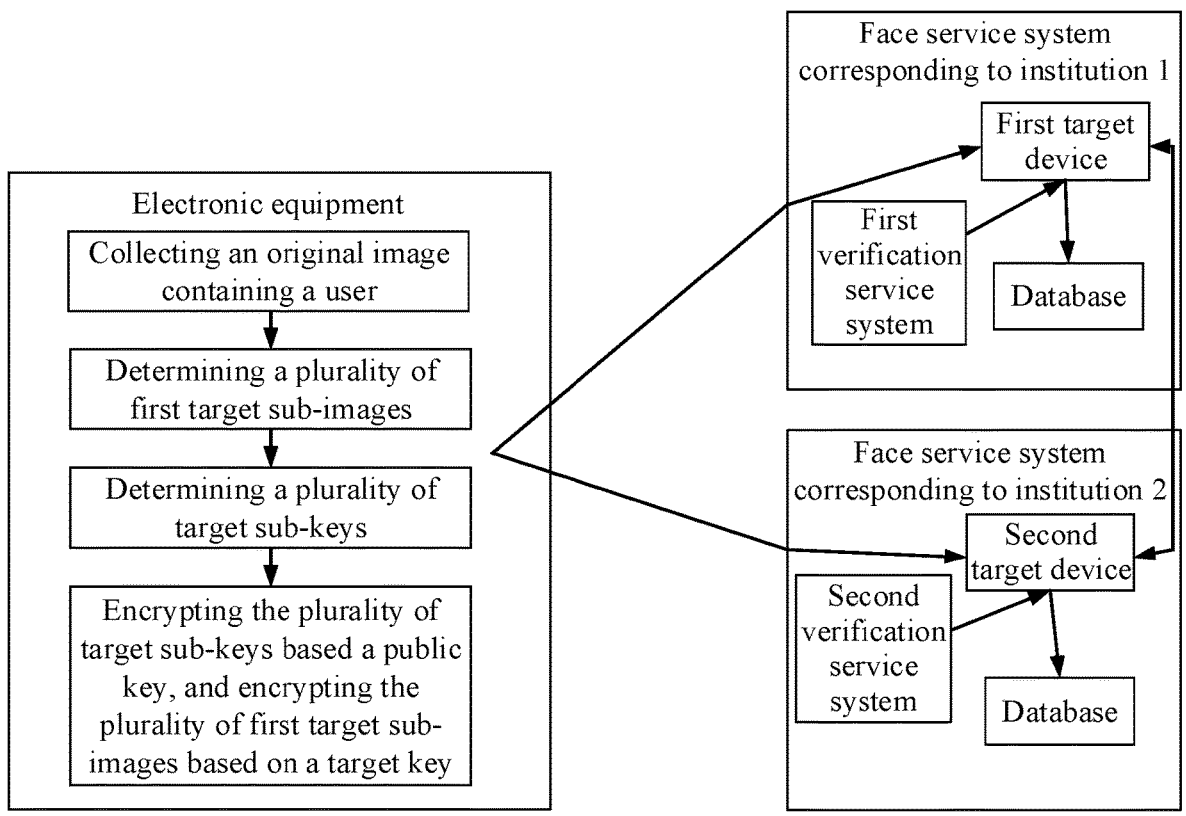
FIG. 8B is a schematic diagram of a process for recognizing a feature vector corresponding to an original image containing a user provided by some embodiments of the present disclosure.

FIG. 8A is a schematic diagram of a process for recognizing a feature vector corresponding to an original image containing a user based on MPC in the related art. FIG. 8B is a schematic diagram of a process for recognizing a feature vector corresponding to an original image containing a user provided by some embodiments of the present disclosure. FIG. 8A and FIG. 8B are described.

The description is made assuming that the number of target devices to receive images is 2.

In the related art, electronic equipment first obtains the original image containing the user, performs features extraction on the original image, determines that a corresponding feature vector is split into a first feature vector and a second feature vector, respectively encrypts the first feature vector and the second feature vector based on an obtained target key pair, and sends the encrypted first feature vector and the encrypted second feature vector to a corresponding first target device and a corresponding second target device respectively. The first target device obtains a target key, and decrypts the encrypted first feature vector based on the target key, to obtain the decrypted first feature vector and store the first feature vector after decryption in the database of the first target device. The second target device obtains a target key, and decrypts the encrypted second feature vector based on the target key, to obtain the decrypted second feature vector and store the second feature vector after decryption in the database of the second target device. Since the feature vectors of users are pre-stored in the first target device and the second target device respectively, the first target device compares the first feature vector (after decryption) with the feature vectors of each user pre-stored in the first target device, the second target device compares the second feature vector (after decryption) with the feature vectors of each user pre-stored in the second target device, and the identity of the user is determined according to the two comparison results.

In the embodiments of the present disclosure, the electronic equipment first obtains the original image containing the user, and processes the pixel values corresponding to the pixels in the original image to obtain a plurality of processed first target images. The plurality of first target images are encrypted based on a target key, and the target key is divided into multiple target sub-keys, and each target sub-key is encrypted respectively according to the received public key from each target device, and each encrypted first target image and each encrypted target sub-key are sent to each corresponding target device.

Each target device is located in a face service system corresponding to each institution. For the face service system corresponding to each institution, the face service system corresponding to the institution includes the target device and the verification service system. For example, the face service system corresponding to institution 1 includes the first target device and the first verification service system, and the face service system corresponding to institution 2 includes the second target device and the second verification service system.

The first target device receives the encrypted first target image 1 and the encrypted target sub-key 1, and the second target device receives the encrypted first target image 2 and the encrypted target sub-key 2. Taking the first target device restoring the original image for illustration, the first target device generates a random number and sends the random number to the second target device. The second target device generates target verification information based on its own identification information and attribute information, and sends the target verification information to the first target device. The first target device receives the target verification information from the second target device, sends a verification information acquisition instruction to the first verification service system, and obtains standard verification information of each device. If the standard verification information of each device exists standard verification information consistent with the target verification information, it determines that the second target device is credible.

The first target device decrypts the received encrypted target sub-key 1 sent by the electronic equipment based on the private key generated by itself, and obtains the decrypted target sub-key 1. The target public-private key pair is generated, the target public key in the target public-private key pair is sent to the second target device, and an image acquisition instruction is sent to the second target device. After receiving the image acquisition instruction and the target public key, the second target device decrypts the received encrypted target sub-key 2 sent by the electronic equipment based on the private key generated by itself, encrypts the obtained decrypted target sub-key 2 based on the target public key, and sends the encrypted target sub-key 2 and the encrypted first target image 2 to the first target device. After receiving the encrypted target sub-key 2, the first target device, based on the generated target public-private key pair, decrypts the encrypted target sub-key 2, and obtains the decrypted target sub-key 2.

The decrypted target sub-key 1 and the decrypted target sub-key 2 are spliced to determine the target key, and based on the target key, each encrypted first target image 1 and encrypted first target image 2 are decrypted to obtain each target image. The pixel values corresponding to the pixels in each target image are processed to obtain the original image.

The original image is input into the pre-trained features extraction model in the first target device, the pixel values corresponding to the pixels in the original image are processed based on the pre-trained features extraction model to obtain two third target images output from the pre-trained features extraction model, any third target image in the two third target images is determined as the fourth target image, the feature vectors corresponding to the fourth target image is extracted based on the pre-trained features extraction model in the first target device, and another third target image of the two third target images except the fourth target image is sent to the second target device.

After receiving the other third target image, the second target device obtains the feature vector of the other third target image based on the pre-trained features extraction model in the second target device.

After determining the feature vector corresponding to the fourth target image, the first target device divides the feature vector into a feature vector 1 and a feature vector 2. After determining the feature vector corresponding to another third target image, the second target device divides the feature vector into a feature vector 3 and a feature vector 4. The first target device may send the feature vector 2 to the second target device, and receive the feature vector 4 from the second target device. The second target device may send the feature vector 4 to the first target device, and receive the feature vector 2 from the first target device. That is, the feature vector 1 and feature vector 4 are stored in the first target device, and the feature vector 2 and the feature vector 3 are stored in the second target device.

Embodiment 12

Figure 9:
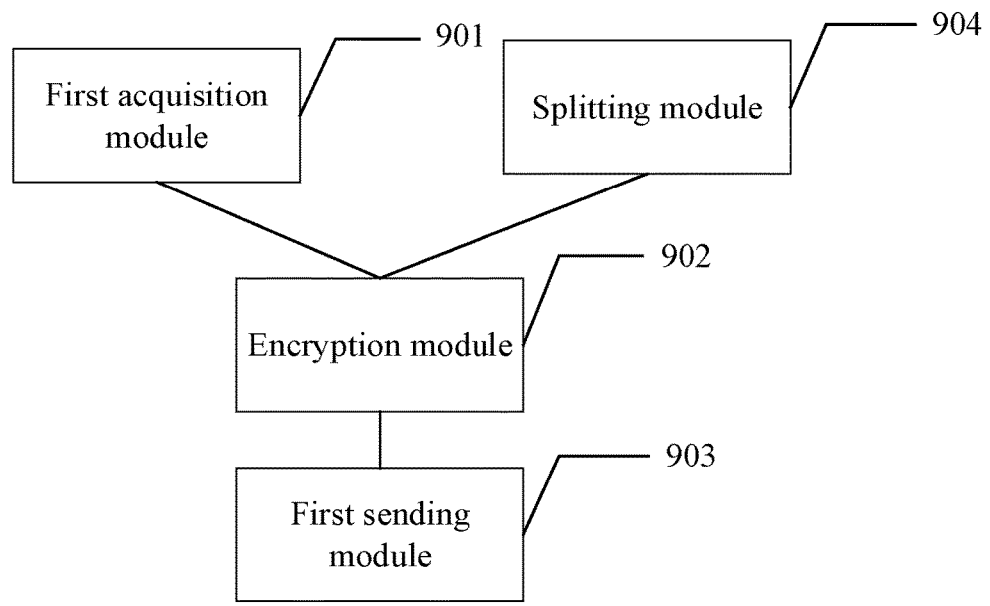
FIG. 9 is a schematic structural diagram of an image encryption apparatus provided by some embodiments of the present disclosure.

FIG. 9 is a schematic structural diagram of an image encryption apparatus provided by some embodiments of the present disclosure. The apparatus includes:
- a first acquisition module 901, configured to process pixel values corresponding to pixels in an original image containing a user according to the number of target devices for receiving images, to obtain a plurality of first target images after processing, where the original image is obtained according to the plurality of first target images;
- an encryption module 902, configured to encrypt each of the plurality of first target images with a target key; and
- a first sending module 903, configured to send each of the plurality of first target images after encryption to each corresponding target device.

In a possible embodiment, the first acquisition module 901 is specifically configured to for the pixel value of each of the pixels in the original image, split the pixel value into the number of sub-pixel values according to the number of target devices for receiving images, where a sum of the sub-pixel values is equal to the pixel value; and determine the pixel value of the corresponding pixel in each processed first target image according to the number of sub-pixel values corresponding to each pixel.

In a possible embodiment, the first acquisition module 901 is specifically configured to determine a corresponding pixel matrix of the original image on each of preset channels, where each element in the pixel matrix is the pixel value corresponding to each pixel on the corresponding channel; for each pixel value in the pixel matrix corresponding to each channel, split the pixel value in the pixel matrix corresponding to the channel into the number of sub-pixel values according to the number of target devices to receive images, where a sum of the sub-pixel values is equal to the pixel value in the pixel matrix corresponding to the channel; and determine the pixel value of the corresponding pixel after processing in each first target image corresponding to each processed channel, according to the number of sub-pixel values corresponding to each pixel in the pixel matrix corresponding to each channel.

In a possible embodiment, the first acquisition module 901 is specifically configured to divide the original image into the number of sub-images according to the number of target devices for receiving images; and for each of the sub-images, set pixel values of pixels in the original image other than pixels contained in the sub-image as preset pixel values, to obtain the processed first target image corresponding to the sub-image.

In a possible embodiment, the first acquisition module 901 is specifically configured to determine a second target image corresponding to the original image on each preset channel; for the corresponding second target image on each channel, dividing the corresponding second target image on the channel into the number of sub-images according to the number of target devices for receiving images; for each sub-image corresponding to the corresponding second target image on each channel, set pixel values of pixels other than pixels contained in the sub-image in the corresponding second target image on the channel to preset pixel values, to obtain the processed first target image corresponding to the sub-image in the second target image on the channel.

In a possible embodiment, the apparatus further includes:
a splitting module 904, configured to divide the target key into the number of target sub-keys according to the number of target devices, where the number of target sub-keys are spliced into the target key;
an encryption module 902, further configured to encrypt the target sub-keys according to a public key from each target device;
a first sending module 903, specifically configured to send the encrypted first target image and the encrypted target sub-key to each corresponding target device respectively.

Embodiment 13

Figure 10:
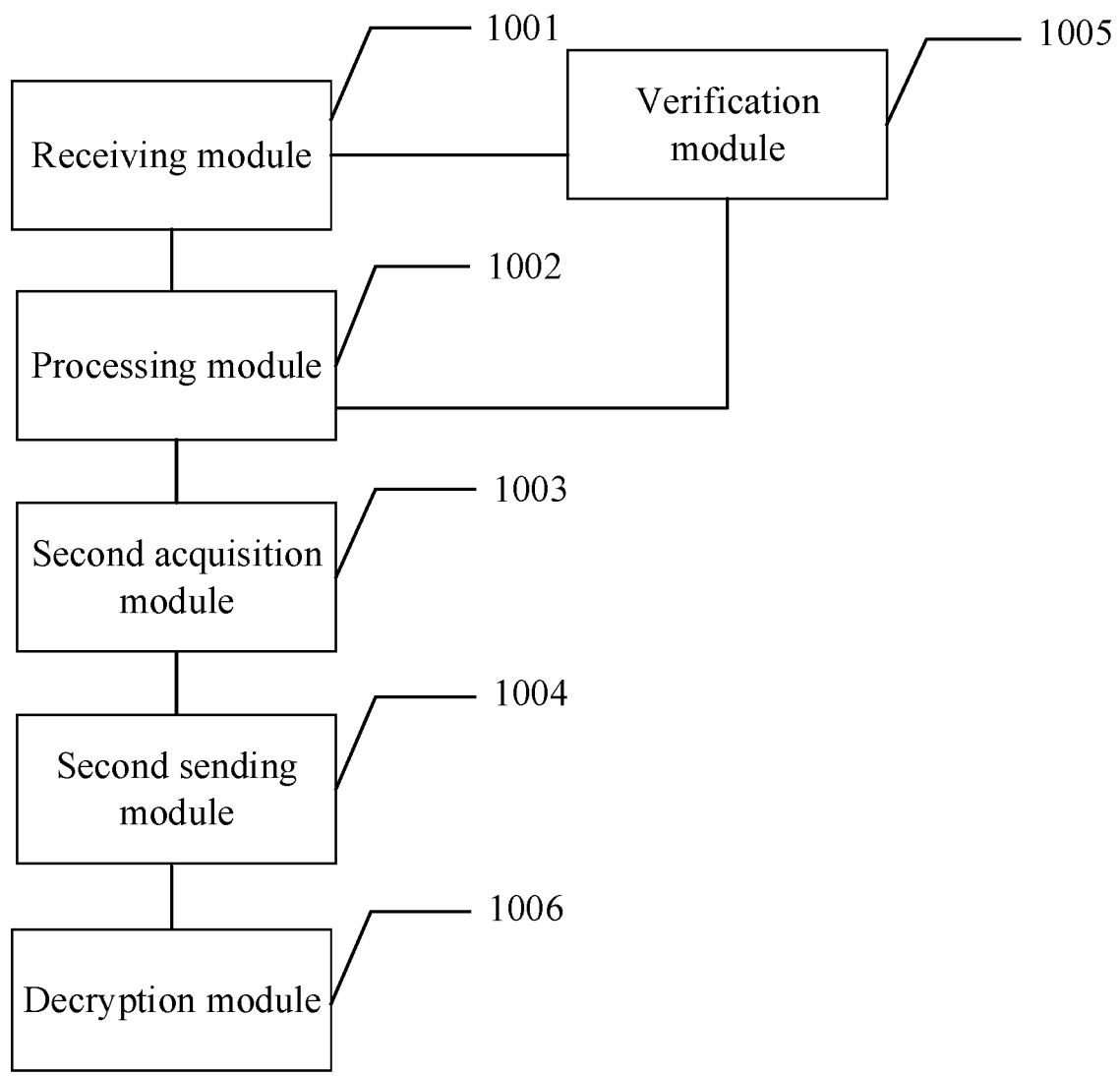
FIG. 10 is a schematic structural diagram of an image processing apparatus provided by some embodiments of the present disclosure.

FIG. 10 is a schematic structural diagram of an image processing apparatus provided by some embodiments of the present disclosure. The apparatus includes:
a receiving module 1001, configured to receive an encrypted first target image from electronic equipment;
a processing module 1002, configured to send an image acquisition instruction to other target devices; and receive other encrypted first target images from the other target devices; and
a second acquisition module 1003, configured to acquire a target key, and decrypt the first target image and each of the other first target images based on the target key to obtain each target image; and process pixel values corresponding to the pixels in each target image to obtain an original image.

In a possible embodiment, the second acquisition module 1003 is further configured to input the original image into a pre-trained features extraction model, and obtain and save feature vectors corresponding to the original image.

In a possible embodiment, the second acquisition module 1003 is specifically configured to process pixel values corresponding to pixels in the original image to obtain a plurality of third target images, where the original image is obtained according to the plurality of third target images; and determine any one of the plurality of third target images as a fourth target image; and perform feature vector extraction on the fourth target image based on the pre-trained features extraction model to obtain the feature vectors corresponding to the fourth target image.

In a possible embodiment, the apparatus further includes:
a second sending module 1004, configured to send the third target images except the fourth target image among the plurality of third target images to the other target devices, to enable the other target devices to perform feature vector extraction on the received third target image based on the pre-trained feature extraction model respectively, to obtain feature vectors corresponding to the respective third target images.

In a possible embodiment, the second sending module 1004 is further configured to according to the number of target devices, divide the feature vectors into the number of sub-feature vectors, and save any one of the sub-feature vectors, and send other sub-feature vectors to the other target devices respectively; and receive and store the sub-feature vectors from the other target devices.

In a possible embodiment, the apparatus further includes:
a verification module 1005, configured to receive target verification information from the other target devices, and in response to the target verification information being consistent with standard verification information in pre-stored standard verification information of respective devices, determine that the other target devices are credible, where the target verification information is generated by the other target devices according to identification information and attribute information of the other target device; and in response to determining that the other target devices are credible, trigger the processing module.

In a possible embodiment, the second acquisition module 1003 is configured to receive a encrypted target sub-key from the electronic equipment, and decrypt the encrypted target sub-key based on a private key, and receive encrypted target private sub-keys after from the other target devices; and splice each received decrypted target private sub-keys to generate the target key.

In a possible embodiment, the second sending module 1004 is further configured to for each of the other target devices, generate a target public-private key pair, and send a target public key in the target public-private key pair to the other target devices, to enable the other target devices to decrypt the encrypted target private sub-key based on the private key, and encrypt the target private sub-key after decryption based on the target public key.

The apparatus further includes:
a decryption module 1006, configured to decrypt the received encrypted target private sub-keys based on a target private key in the target public-private key pair.

In a possible embodiment, the second acquisition module 1003 is specifically configured to according to the pixel value of each pixel in each target image, determine a sum of the pixel values of the pixel in each target image as the corresponding pixel value of the pixel in the original image.

In a possible embodiment, the second acquisition module 1003 is specifically configured to, for the pixel value corresponding to each pixel of each target image in the pixel matrix corresponding to each preset channel, determine the sum of the pixel values corresponding to the pixel of each target image in the pixel matrix corresponding to the channel as the corresponding pixel value of the pixel in the original image in the channel.

In a possible embodiment, the second acquisition module 1003 is specifically configured to, for any target image, determine a target pixel whose pixel value in the target image is not a preset pixel value; and set the pixel value of the target pixel in the original image as the pixel value of the corresponding target pixel in the target image to obtain the original image.

In a possible embodiment, the second acquisition module 1003 is specifically configured to according to each pixel in each target image on each preset channel, determine whether the pixel value of the pixel in the target image on the channel is non-preset pixel value, and if so, determine the pixel as the target pixel on the channel; set the pixel value of the target pixel in the original image on the channel as the pixel value of the target pixel in the sub-image corresponding to the target image on the channel; and obtain the original image according to the pixel value of the target pixel of the original image on each channel.

Embodiment 14

Figure 11:
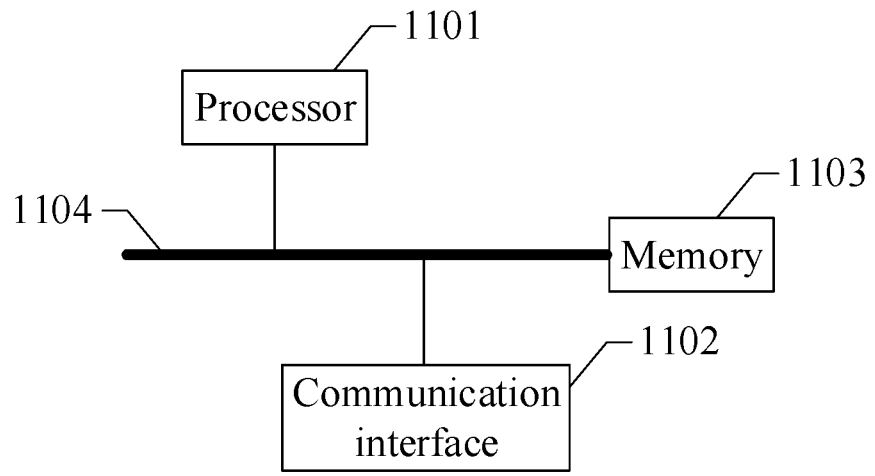
FIG. 11 is a schematic structural diagram of electronic equipment provided by some embodiments of the present disclosure.

On the basis of the above embodiments, some embodiments of the present disclosure further provide electronic equipment. As shown in FIG. 11, the electronic equipment includes a processor 1101, a communication interface 1102, a memory 1103 and a communication bus 1104. The processor 1101, the communication interface 1102 and the memory 1103 communicate with each other through the communication bus 1104.

The memory 1103 is configured to store computer programs, where the programs are executed by the processor 1101 to cause the processor 1101 to perform followings:
processing pixel values corresponding to pixels in an original image containing a user according to the number of target devices to receive images, to obtain a plurality of processed first target images, where the original image is obtained according to the plurality of first target images;
encrypting each of the plurality of first target images with a target key; and
sending each of the plurality of first target images after encryption to each corresponding target device.

Further, the processor 1101 is further configured to for the pixel value of each of the pixels in the original image, split the pixel value into the number of sub-pixel values according to the number of target devices to receive images, where a sum of the sub-pixel values is equal to the pixel value; and determining the pixel value of the corresponding pixel after processing in each first target image after processing according to the number of sub-pixel values corresponding to each pixel.

Further, the processor 1101 is further configured to determine a corresponding pixel matrix of the original image on each of preset channels, where each element in the pixel matrix is the pixel value corresponding to each pixel on the corresponding channel; for each pixel value in the pixel matrix corresponding to each channel, splitting the pixel value in the pixel matrix corresponding to the channel into the quantity of sub-pixel values according to the number of target devices to receive images, where a sum of the sub-pixel values is equal to the pixel value in the pixel matrix corresponding to the channel; determine the pixel value of the corresponding pixel after processing in each first target image corresponding to each processed channel, according to the number of sub-pixel values corresponding to each pixel in the pixel matrix corresponding to each channel.

Further, the processor 1101 is further configured to divide the original image into the number of sub-images according to the number of target devices to receive images; and for each of the sub-images, setting pixel values of pixels in the original image other than pixels contained in the sub-image as preset pixel values, to obtain the processed first target image corresponding to the sub-image.

Further, the processor 1101 is further configured to determine a second target image corresponding to the original image on each preset channel; for the corresponding second target image on each channel, divide the corresponding second target image on the channel into the number of sub-images according to the number of target devices receiving images; for each sub-image corresponding to the corresponding second target image on each channel, setting pixel values of pixels other than pixels contained in the sub-image in the corresponding second target image on the channel to preset pixel values, to obtain the first target image after processing corresponding to the sub-image in the second target image on the channel.

Further, the processor 1101 is further configured to divide the target key into the number of target sub-keys according to the number of target devices, where the number of target sub-keys are spliced into the target key; encrypt the number of target sub-keys according to a public key from each target device; and send the encrypted first target image and the encrypted target sub-key to each corresponding target device respectively.

The communication bus mentioned above for the server may be a peripheral component interconnect (PCI) bus or an extended industry standard architecture (EISA) bus or the like. The communication bus includes an address bus, a data bus, a control bus, and the like. For ease of representation, only one thick line is used in the figures, but it does not mean that there is only one bus or one type of bus.

The communication interface 1102 is configured for communication between the electronic equipment and other devices.

The memory may include a random access memory (RAM), and may also include a non-volatile memory (NVM), such as at least one disk memory. Optionally, the memory may also be at least one storage device located away from the aforementioned processor.

The above mentioned processor can be a general processor, including central processing unit, network processor (NP), etc. The processor may also be a digital signal processing (DSP), a specialized integrated circuit, field programmable gate displays or other programmable logic devices, discrete gates or transistor logic devices, discrete hardware components, etc.

Embodiment 15

Figure 12:
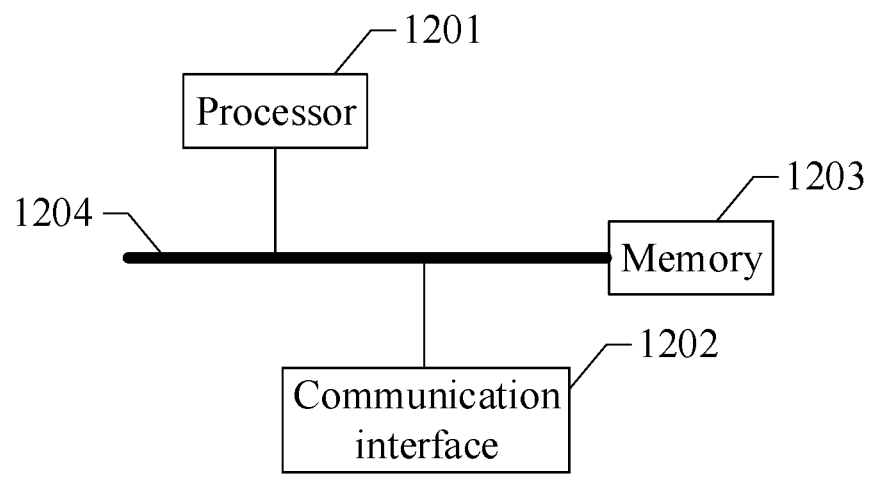
FIG. 12 is a schematic structural diagram of electronic equipment provided by some embodiments of the present disclosure.

On the basis of the above-mentioned embodiments, some embodiments of the present disclosure further provide electronic equipment. As shown in FIG. 12, the electronic equipment includes a processor 1201, a communication interface 1202, a memory 1203 and a communication bus 1204. The processor 1201, the communication interface 1202, the memory 1203 communicate with each other through the communication bus 1204.

The memory 1203 is configured to store computer programs, where the programs are executed by the processor 1201 to cause the processor 1201 to perform:

receiving an encrypted first target image from electronic equipment;

sending an image acquisition instruction to other target devices;

receiving other encrypted first target images from the other target devices;

acquiring a target key, and decrypting the first target image and each of the other first target images based on the target key to obtain each target image; and processing pixel values corresponding to pixels in each target image to obtain an original image.

Further, the processor 1201 is further configured to input the original image into a pre-trained features extraction model, obtain and save feature vectors corresponding to the original image.

Further, the processor 1201 is further configured to process pixel values corresponding to pixels in the original image to obtain a plurality of third target images, where the original image is obtained according to the plurality of third target images; determining any one of the plurality of third target images as a fourth target image; and performing feature vector extraction on the fourth target image based on the pre-trained features extraction model to obtain feature vectors corresponding to the four target image.

Further, the processor 1201 is further configured to send the third target images except the fourth target image among the plurality of third target images to the other target devices, to enable the other target devices to perform feature vector extraction on the received third target images based on the pre-trained respectively, to obtain feature vectors corresponding to the respective third target images.

Further, the processor 1201 is further configured to according to the number of target devices, divide the feature vectors into the number of sub-feature vectors, save any one of the sub-feature vectors, and send other sub-feature vectors to the other target devices respectively; and receive and store the sub-feature vectors from the other target devices.

Further, the processor 1201 is further configured to receive target verification information from the other target devices, and in response to the target verification information being consistent with standard verification information in pre-stored standard verification information of respective devices, determine that the other target devices are credible, where the target verification information is generated by the other target devices according to identification information and attribute information of the other target devices; and in response to determining that the other target devices are credible, perform the operation of sending the image acquisition instruction to the other target devices.

Further, the processor 1201 is further configured to receive an encrypted target sub-key from the electronic equipment, decrypt the encrypted target sub-key based on a private key, and receive decrypted target private sub-keys from the other target devices; and splice each received decrypted target private sub-keys to generate the target key.

Further, the processor 1201 is further configured to for each of the other target devices, generate a target public-private key pair, and send a target public key in the target public-private key pair to the other target devices, to enable the other target devices to decrypt the encrypted target private sub-key based on the private key, and encrypt the decrypted target private sub-key based on the target public key; and decrypt the received encrypted target private sub-keys based on a target private key in the target public-private key pair.

Further, the processor 1201 is further configured to, according to the pixel value of each pixel in each target image, determine a sum of the pixel values of the pixel in each target image as the corresponding pixel value of the pixel in the original image.

Further, the processor 1201 is further configured to for the pixel value corresponding to each pixel of each target image in the pixel matrix corresponding to each preset channel, determine the sum of the pixel values corresponding to the pixel of each target image in the pixel matrix corresponding to the channel as the corresponding pixel value of the pixel in the original image in the channel.

Further, the processor 1201 is further configured to, for any target image, determine a target pixel whose pixel value in the target image is not a preset pixel value; and set the pixel value of the target pixel in the original image as the pixel value of the corresponding target pixel in the target image to obtain the original image.

Further, the processor 1201 is further configured to according to each pixel in each target image on each preset channel, determine whether the pixel value of the pixel in the target image on the channel is a non-preset pixel value, and if so, determine the pixel is the target pixel on the channel; set the pixel value of the target pixel in the original image on the channel as the pixel value of the target pixel in the sub-image corresponding to the target image on the channel; and obtain the original image according to the pixel value of the target pixel of the original image on each channel.

The communication bus mentioned above for the server may be a peripheral component interconnect (PCI) bus or an extended industry standard architecture (EISA) bus or the like. The communication bus includes an address bus, a data bus, a control bus, and the like. For ease of representation, only one thick line is used in the figures, but it does not mean that there is only one bus or one type of bus.

The communication interface 1202 is configured for communication between the electronic equipment and other devices.

The memory may include a random access memory (RAM), and may also include a non-volatile memory (NVM), such as at least one disk memory. Optionally, the memory may also be at least one storage device located away from the aforementioned processor.

The above mentioned processor can be a general processor, including central processing unit, network processor (NP) etc. The processor may also be a digital signal processing (DSP), a specialized integrated circuit, field programmable gate displays or other programmable logic devices, discrete gates or transistor logic devices, discrete hardware components, etc.

Embodiment 16

On the basis of the above-mentioned embodiments, the embodiments of the present disclosure further provide a computer-readable storage medium. The computer-readable storage medium stores computer programs executable by the electronic equipment, and the programs run on the electronic equipment to enable the electronic equipment to perform:

processing pixel values corresponding to pixels in an original image containing a user according to the number of target devices to receive images, to obtain a plurality of first target images after processing, where the original image is obtained according to the plurality of first target images;

encrypting each of the plurality of first target images with a target key; and sending each of the plurality of encrypted first target images to each corresponding target device.

Further, the processing the pixel values corresponding to the pixels in the original image containing the user according to the quantity of target devices to receive images, to obtain the plurality of encrypted first target images, includes:

for the pixel value of each of the pixels in the original image, splitting the pixel value into the number of sub-pixel values according to the number of target devices for receiving images, wherein a sum of the sub-pixel values is equal to the pixel value; and determining the pixel value of the corresponding pixel in each processed first target image according to the number of sub-pixel values corresponding to each pixel.

Further, for the pixel value of each of the pixels in the original image, splitting the pixel value into the number of sub-pixel values according to the number of target devices for receiving images, includes:

determining a corresponding pixel matrix of the original image on each of preset channels, where each element in the pixel matrix is the pixel value corresponding to each pixel on the corresponding channel;

for each pixel value in the pixel matrix corresponding to each channel, splitting the pixel value in the pixel matrix corresponding to the channel into the quantity of sub-pixel values according to the number of target devices for receiving images, where a sum of the sub-pixel values is equal to the pixel value in the pixel matrix corresponding to the channel;

the determining the pixel value of the corresponding pixel in each processed first target image according to the number of sub-pixel values corresponding to each pixel, includes:

determining the pixel value of the corresponding pixel after processing in each first target image corresponding to each processed channel, according to the number of sub-pixel values corresponding to each pixel in the pixel matrix corresponding to each channel.

Further, the processing the pixel values corresponding to the pixels in the original image containing the user according to the quantity of target devices for receiving images, to obtain the plurality of first target images after processing, includes:

dividing the original image into the number of sub-images according to the number of target devices for receiving images; and for each of the sub-images, setting pixel values of pixels in the original image other than pixels contained in the sub-image as preset pixel values, to obtain the processed first target image corresponding to the sub-image.

Further, the dividing the original image into the number of sub-images according to the number of target devices for receiving images, includes:

determining a second target image corresponding to the original image on each preset channel;

for the corresponding second target image on each channel, dividing the corresponding second target image on the channel into the number of sub-images according to the number of target devices for receiving images;

the setting pixel values of pixels in the original image other than pixels contained in the sub-image as preset pixel values, to obtain the processed first target image corresponding to the sub-image, includes:

for each sub-image corresponding to the corresponding second target image on each channel, setting pixel values of pixels other than pixels contained in the sub-image in the corresponding second target image on the channel to preset pixel values, to obtain the processed first target image corresponding to the sub-image in the second target image on the channel.

Further, after encrypting each of the plurality of first target images with the target key, before sending each of the plurality of encrypted first target images to each corresponding target device, the method further includes:

dividing the target key into the number of target sub-keys according to the number of target devices, where the number of target sub-keys are spliced into the target key;

encrypting the number of target sub-keys according to a public key from each target device;

the sending each of the plurality of encrypted first target images to each corresponding target device, includes:

sending the encrypted first target image and the encrypted target sub-key to each corresponding target device respectively.

Embodiment 17

On the basis of the above-mentioned embodiments, the embodiments of the present disclosure further provide a computer-readable storage medium. The computer-readable storage medium stores computer programs executable by the electronic equipment. The programs run on the electronic equipment to cause the electronic equipment to perform followings:

receiving an encrypted first target image from an electronic equipment;

sending an image acquisition instruction to other target devices;

receiving other encrypted first target images from the other target devices;

acquiring a target key, and decrypting the first target image and each of the other first target images based on the target key to obtain each target image; and processing pixel values corresponding to pixels in each target image to obtain an original image.

Further, the method further includes:

inputting the original image into a pre-trained features extraction model, and obtaining and saving feature vectors corresponding to the original image.

Further, the inputting the original image into the pre-trained features extraction model, and obtaining the feature vectors corresponding to the original image, includes:

processing pixel values corresponding to pixels in the original image to obtain a plurality of third target images, where the original image is obtained according to the plurality of third target images;

determining any one of the plurality of third target images as a fourth target image; and performing feature vector extraction on the fourth target image based on the pre-trained features extraction model to obtain feature vectors corresponding to the fourth target image.

Further, the method further includes:

sending the third target images except the fourth target image among the plurality of third target images to the other target devices, to enable the other target devices to perform feature vector extraction on the received third target images based on the pre-trained respectively, to obtain feature vectors corresponding to the respective third target images.

Further, after obtaining the feature vectors corresponding to the target image, the method further includes:
  according to the number of target devices, dividing the feature vectors into the number of sub-feature vectors, saving any one of the sub-feature vectors, and sending other sub-feature vectors to the other target devices respectively; and receiving and storing the sub-feature vectors from the other target devices.

Further, after receiving the encrypted first target image from the electronic equipment and before sending the image acquisition instruction to the other target devices, the method further includes:
  receiving target verification information from the other target devices, and in response to the target verification information being consistent with standard verification information in pre-stored standard verification information of respective devices, determining that the other target devices are credible, where the target verification information is generated by the other target devices according to identification information and attribute information of the other target devices; and
  in response to the other target devices being credible, performing the operation of sending the image acquisition instruction to the other target devices.

Further, the acquiring the target key, includes:
  receiving an encrypted target sub-key from the electronic equipment, decrypting the encrypted target sub-key based on a private key, and receiving decrypted target private sub-keys from the other target devices; and splicing each received decrypted target private sub-keys to generate the target key.

Further, before receiving the decrypted target private sub-keys from the other target devices, the method further includes:
  for each of the other target devices, generating a target public-private key pair, and sending a target public key in the target public-private key pair to the other target devices, to enable the other target devices to decrypt the target private sub-key after encryption based on the private key, and encrypt the target private sub-key after decryption based on the target public key;
  after receiving decrypted target private sub-keys from the other target device, before splicing each received decrypted target private sub-key, the method further includes:
  decrypting the received target private encrypted sub-keys based on a target private key in the target public-private key pair.

Further, the processing the pixel values corresponding to the pixels in each target image to obtain the original image, includes:
  according to the pixel value of each pixel in each target image, determining a sum of the pixel values of the pixel in each target image as the corresponding pixel value of the pixel in the original image.

Further, the determining the sum of the pixel values of the pixel in each target image as the corresponding pixel value of the pixel in the original image, includes:
  for the pixel value corresponding to each pixel of each target image in the pixel matrix corresponding to each preset channel, determining the sum of the pixel values corresponding to the pixel of each target image in the pixel matrix corresponding to the channel as the corresponding pixel value of the pixel in the original image in the channel.

Further, the processing the pixel values corresponding to the pixels in each target image to obtain the original image, includes:
  for any target image, determining a target pixel whose pixel value in the target image is not a preset pixel value; and setting the pixel value of the target pixel in the original image as the pixel value of the corresponding target pixel in the target image to obtain the original image.

Further, the determining the target pixel whose pixel value in the target image is not the preset pixel value, includes:
  according to each pixel in each target image on each preset channel, determining whether the pixel value of the pixel in the target image on the channel is a non-preset pixel value, and if so, determining the pixel is the target pixel on the channel;
  the setting the pixel value of the target pixel in the original image as the pixel value of the corresponding target pixel in the target image, to obtain the original image, includes:
  setting the pixel value of the target pixel in the original image on the channel as the pixel value of the target pixel in the sub-image corresponding to the target image on the channel; and
  obtaining the original image according to the pixel value of the target pixel of the original image on each channel.

Since in the embodiments of the present disclosure, each of the plurality of first target images is obtained after processing the pixel values corresponding to the pixels in the original image, the pixel values corresponding to the pixels contained in each first target image are not all the same as the pixel values corresponding to the pixels in the original image, and since the plurality of first target images are respectively sent to the corresponding target devices after obtaining the plurality of first target images, therefore, regardless of whether the attack is carried out during the transmission of the first target image, or the target device that stores the first target image is attacked, it is impossible to obtain the original image based on a single first target image, which ensures the security of image transmission and storage, protects user privacy and improves user experience.

Those skilled in the art should understand that the embodiments of the present disclosure may be provided as methods, systems, or computer program products. Accordingly, the present disclosure may take the form of an entirely hardware embodiment, an entirely software embodiment, or an embodiment combining software and hardware aspects. Furthermore, the present disclosure may take the form of a computer program product embodied on one or more computer-usable storage media (including but not limited to disk storage, CD-ROM, optical storage, etc.) having computer-usable program codes embodied therein.

The present disclosure is described with reference to flowchart illustrations and/or block diagrams of methods, apparatus (systems), and computer program products according to the present disclosure. It should be understood that each procedure and/or block in the flowchart and/or block diagram, and a combination of procedures and/or blocks in the flowchart and/or block diagram can be realized by computer program instructions. These computer program instructions can be provided to a general purpose computer, special purpose computer, embedded processor, or processor of other programmable image processing devices to produce a machine, such that instructions executed by the processor of the computer or other programmable image processing devices produce an apparatus for realizing the functions specified in one or more procedures of the flowchart and/or one or more blocks of the block diagram.

These computer program instructions may also be stored in a computer-readable memory capable of directing a computer or other programmable image processing device to operate in a specific manner, such that the instructions stored in the computer-readable memory produce an article of manufacture including instruction means, the device realizes the function specified in one or more procedures of the flowchart and/or one or more blocks of the block diagram.

These computer program instructions can also be loaded on a computer or other programmable image processing device, so that a series of operation steps are performed on the computer or other programmable device to produce a computer-implemented process, so that instructions executed on the computer or other programmable device provide steps for implementing the functions specified in one or more flow charts and/or one or more blocks of the block diagram.

Obviously, those skilled in the art can make various changes and modifications to the present disclosure without departing from the spirit and scope of the present disclosure. In this way, if these modifications and variations of the present disclosure fall within the scope of the claims of the present disclosure and their equivalent technologies, the present disclosure is also intended to include these modifications and variations.

What is claimed is:

1. An image encryption method, applied to an electronic equipment, and comprising:
    processing pixel values corresponding to pixels in an original image containing a user according to a quantity of target devices for receiving images, to obtain a plurality of first target images after processing, wherein the original image is obtained according to the plurality of first target images;
    encrypting each of the plurality of first target images with a target key; and
    sending each of the plurality of first target images after encryption to each corresponding target device;
    wherein after encrypting each of the plurality of first target images with the target key, before sending each of the plurality of encrypted first target images to each corresponding target device, the method further comprises:
    dividing the target key into the quantity of target sub-keys according to the quantity of target devices, wherein the quantity of target sub-keys are spliced into the target key;
    encrypting the target sub-keys according to a public key from each target device;
    the sending each of the plurality of encrypted first target images to each corresponding target device, includes:
    sending the encrypted first target image and the encrypted target sub-key to each corresponding target device respectively.

2. The method according to claim 1, wherein the processing the pixel values corresponding to the pixels in the original image containing the user according to the quantity of target devices for receiving images, to obtain the plurality of first target images after processing, comprises:
    for the pixel value of each of the pixels in the original image, splitting the pixel value into the quantity of sub-pixel values according to the quantity of target devices for receiving images, wherein a sum of the sub-pixel values is equal to the pixel value; and
    determining the pixel value of the corresponding pixel after processing in each first target image according to the quantity of sub-pixel values corresponding to each pixel.

3. The method according to claim 2, wherein, for the pixel value of each of the pixels in the original image, splitting the pixel value into the quantity of sub-pixel values according to the quantity of target devices for receiving images, comprises:
    determining a corresponding pixel matrix of the original image on each of preset channels, wherein each element in the pixel matrix is the pixel value corresponding to each pixel on the corresponding channel;
    for each pixel value in the pixel matrix corresponding to each channel, splitting the pixel value in the pixel matrix corresponding to the channel into the quantity of sub-pixel values according to the quantity of target devices for receiving images, wherein a sum of the sub-pixel values is equal to the pixel value in the pixel matrix corresponding to the channel;
    the determining the pixel value of the corresponding pixel after processing in each first target image according to the quantity of sub-pixel values corresponding to each pixel, comprises:
    determining the pixel value of the corresponding pixel after processing in each first target image corresponding to each channel, according to the quantity of sub-pixel values corresponding to each pixel in the pixel matrix corresponding to each channel.

4. The method according to claim 1, wherein the processing the pixel values corresponding to the pixels in the original image containing the user according to the quantity of target devices to receive images, to obtain the plurality of first target images after processing, comprises:
    dividing the original image into the quantity of sub-images according to the quantity of target devices for receiving images; and
    for each of the sub-images, setting pixel values of pixels in the original image other than pixels contained in the sub-image as preset pixel values, to obtain the first target image corresponding to the sub-image.

5. The method according to claim 4, wherein the dividing the original image into the quantity of sub-images according to the quantity of target devices for receiving images, comprises:
    determining a second target image corresponding to the original image on each preset channel;
    for the corresponding second target image on each channel, dividing the corresponding second target image on the channel into the quantity of sub-images according to the quantity of target devices for receiving images;
    the setting pixel values of pixels in the original image other than pixels contained in the sub-image as preset pixel values, to obtain the first target image after processing corresponding to the sub-image, includes:
    for each sub-image corresponding to the corresponding second target image on each channel, setting pixel values of pixels other than pixels contained in the sub-image in the corresponding second target image on the channel to preset pixel values, to obtain the first target image after processing corresponding to the sub-image in the second target image on the channel.

6. An image processing method, applied to a target device, and comprising:

receiving an encrypted first target image from an electronic equipment;
sending an image acquisition instruction to other target devices;
receiving other encrypted first target images from the other target devices;
acquiring a target key, and decrypting the encrypted first target image and each of the other encrypted first target images based on the target key to obtain each target image; and
processing pixel values corresponding to pixels in each target image to obtain an original image;
wherein the acquiring the target key, comprises:
receiving an encrypted target sub-key from the electronic equipment, decrypting the encrypted target sub-key based on a private key, and receiving decrypted target private sub-keys from the other target devices; and
splicing each received decrypted target private sub-keys to generate the target key.

7. The method according to claim 6, further comprising:
inputting the original image into a pre-trained features extraction model, and obtaining and saving feature vectors corresponding to the original image.

8. The method according to claim 7, wherein the inputting the original image into the pre-trained features extraction model, and obtaining the feature vectors corresponding to the original image, comprises:
processing pixel values corresponding to pixels in the original image to obtain a plurality of third target images, wherein the original image is obtained according to the plurality of third target images;
determining any one of the plurality of third target images as a fourth target image; and
performing feature vector extraction on the fourth target image based on the pre-trained features extraction model to obtain feature vectors corresponding to the fourth target image.

9. The method according to claim 8, further comprising:
sending the third target images except the fourth target image among the plurality of third target images to the other target devices, to enable the other target devices to perform feature vector extraction on the received third target images based on the pre-trained features extraction model respectively, to obtain feature vectors corresponding to the respective third target images.

10. The method according to claim 7, wherein after obtaining the feature vectors corresponding to the target image, the method further comprises:
according to the quantity of target devices, dividing the feature vectors into the quantity of sub-feature vectors, saving any one of the sub-feature vectors, and sending other sub-feature vectors to the other target devices respectively; and
receiving and storing the sub-feature vectors from the other target devices.

11. The method according to claim 6, wherein, after receiving the encrypted first target image from the electronic equipment and before sending the image acquisition instruction to the other target devices, the method further comprises:
receiving target verification information from the other target devices, and in response to the target verification information being consistent with standard verification information in pre-stored standard verification information of respective devices, determining that the other target devices are credible, wherein the target verification information is generated by the other target devices according to identification information and attribute information of the other target devices; and
in response to the other target devices being credible, sending the image acquisition instruction to the other target devices.

12. The method according to claim 6, wherein before receiving the decrypted target private sub-keys from the other target devices, the method further comprises:
for each of the other target devices, generating a target public-private key pair, and sending a target public key in the target public-private key pair to the other target devices, to enable the other target devices to decrypt the encrypted target private sub-key based on the private key and encrypt the target private sub-key after decryption based on the target public key;
after receiving decrypted target private sub-keys from the other target devices, before splicing each received decrypted target private sub-key, the method further comprises:
decrypting the received target private sub-keys based on a target private key in the target public-private key pair.

13. The method according to claim 6, wherein the processing the pixel values corresponding to the pixels in each target image to obtain the original image, comprises:
according to the pixel value of each pixel in each target image, determining a sum of the pixel values of the pixel in each target image as the corresponding pixel value of the pixel in the original image.

14. The method according to claim 13, wherein the determining the sum of the pixel values of the pixel in each target image as the corresponding pixel value of the pixel in the original image, comprises:
for the pixel value corresponding to each pixel of each target image in the pixel matrix corresponding to each preset channel, determining the sum of the pixel values corresponding to the pixel of each target image in the pixel matrix corresponding to the channel as the corresponding pixel value of the pixel in the original image in the channel.

15. The method according to claim 6, wherein the processing the pixel values corresponding to the pixels in each target image to obtain the original image, comprises:
for any target image, determining a target pixel whose pixel value in the target image is not a preset pixel value; and
setting the pixel value of the target pixel in the original image as the pixel value of the corresponding target pixel in the target image, to obtain the original image.

16. The method according to claim 15, wherein the determining the target pixel whose pixel value in the target image is not the preset pixel value, comprises:
according to each pixel in each target image on each preset channel, determining whether the pixel value of the pixel in the target image on the channel is a non-preset pixel value, and determining the pixel as the target pixel on the channel in response to the pixel value of the pixel in the target image on the channel being a non-preset pixel value;
the setting the pixel value of the target pixel in the original image as the pixel value of the corresponding target pixel in the target image, to obtain the original image, comprises:
setting the pixel value of the target pixel in the original image on the channel as the pixel value of the target pixel in the sub-image corresponding to the target image on the channel; and obtaining the original image according to the pixel value of the target pixel of the original image on each channel.

* * * * *